United States Patent
Harada et al.

(10) Patent No.: US 6,270,169 B1
(45) Date of Patent: Aug. 7, 2001

(54) ROTARY PUMP AND BRAKING DEVICE USING SAME

(75) Inventors: Tomoo Harada, Anjo; Takahiro Yamaguchi; Toshiya Morikawa, both of Kariya, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/170,052

(22) Filed: Oct. 13, 1998

(30) Foreign Application Priority Data

| Oct. 14, 1997 | (JP) | 9-280660 |
| Oct. 14, 1997 | (JP) | 9-280661 |
| Jun. 1, 1998 | (JP) | 10-151616 |
| Jul. 9, 1998 | (JP) | 10-194687 |
| Aug. 20, 1998 | (JP) | 10-234505 |

(51) Int. Cl.$^7$ ................................... B60T 8/40
(52) U.S. Cl. ..................... 303/116.4; 303/115.1; 303/116.1
(58) Field of Search .............. 303/116.1, 116.4, 303/187, 113.1, 116.3, 115.1; 418/1, 166, 171

(56) References Cited

U.S. PATENT DOCUMENTS

| 3,034,446 | * | 5/1962 | Brundage | 418/171 |
| 3,137,234 | * | 6/1964 | Mosbacher | 418/1 |
| 3,680,989 | * | 8/1972 | Brundage | 418/171 |
| 4,968,233 | | 11/1990 | Nakayoshi | 418/166 |
| 5,090,883 | | 2/1992 | Krauter | 418/171 |
| 5,501,585 | | 3/1996 | Ogawa | 418/171 |
| 5,584,540 | * | 12/1996 | Takeuchi et al. | 303/116.1 |
| 5,711,660 | * | 1/1998 | Mitarai et al. | 418/171 |

FOREIGN PATENT DOCUMENTS

| 61-8484 | 1/1985 | (JP) . |
| 61-138893 | 6/1986 | (JP) . |
| 5-6170 | 1/1993 | (JP) . |
| 8-334092 | 12/1996 | (JP) . |
| 2611371 | 2/1997 | (JP) . |

* cited by examiner

*Primary Examiner*—Robert J. Oberleitner
*Assistant Examiner*—Thomas J. Williams
(74) *Attorney, Agent, or Firm*—Pillsbury Winthrop LLP

(57) ABSTRACT

In a rotary pump, an outer rotor and an inner rotor are assembled in a casing such that, when a clearance between an inner teeth portion of the outer rotor and an outer teeth portion of the inner rotor is substantially nullified at a first closed gap portion having a maximum volume formed between the inner teeth portion and the outer teeth portion, a clearance between the outer rotor and the casing on a side of the first closed gap portion and a clearance between the outer rotor and the casing on a side of a second closed gap portion having a minimum volume, become substantially an equivalent interval. As a result, the outer rotor and the casing can be brought into contact with each other on the side of the second closed gap portion rather than the central axis of the inner rotor. Even in a high pressure discharge operation, the outer rotor is not locked by being squeezed between the inner rotor and the casing.

5 Claims, 16 Drawing Sheets

ROTARY PUMP AND BRAKING DEVICE USING SAME

CROSS REFERENCE TO RELATED APPLICATION

This application is based upon and claims the benefit of priority of Japanese Patent Applications No. H.9-280660 filed on Oct. 14, 1997, No. H.9-280661 filed on Oct. 14, 1997, No. H.10-151616 filed on Jun. 1, 1998, No. H.10-194687 filed on Jul. 9, 1998 and No. H.10-234505 filed on Aug. 20, 1998, the contents of which are incorporated herein by reference.

BACKGROUND OF THE INVENTION

1. Field of the Invention

The present invention relates to a rotary pump for sucking and discharging fluid and a braking apparatus using the rotary pump. In particular, the present invention is preferably applied to an internal gear pump such as a trochoid pump or the like.

2. Description of Related Art

There is a trochoid pump as one type of an internal gear rotary pump. FIG. 22 shows such a trochoid pump. As shown by the drawing, the trochoid pump is constituted by an inner rotor 701 having an outer teeth portion 701a at its outer periphery, an outer rotor 702 having an inner teeth portion 702a at its inner periphery, a casing 704 for containing the outer rotor 702 and the inner rotor 701. The inner rotor 701 and the outer rotor 702 are arranged in the casing 704 in a state where the inner teeth portion 702a and the outer teeth portion 701a are in mesh with each other and a plurality of gap portions 703 are formed by the respective teeth.

When a line running on respective central axes X' and Y' of the outer rotor 702 and the inner rotor 701 is defined as the center line Z' of the pump, an intake port 705 and a discharge port 706 respectively communicating with the plurality of gap portions 703 are formed on both sides of the center line Z'. When the pump is driven, the inner rotor 701 rotates with the central axis Y' as a drive axis. In accordance therewith, the outer rotor 702 also rotates in the same direction by mesh between the outer teeth portion 701a and the inner teeth portion 702a. In this case, each of the gap portions 703 changes from a large volume to a small volume and vice versa during a time period in which the outer rotor 702 and the inner rotor 701 make one turn. Due to that volume change, oil is sucked from the intake port 705 and discharged to the discharge port 706.

In the internal gear pump such as a trochoid pump operating in this way, oil may leak from a clearance between the outer rotor 702 and the inner rotor 701. The oil leakage is caused since the outer rotor 702 is separated from the inner rotor 701 and a clearance is produced at a gap portion of which the volume becomes its maximum among the plurality of gap portions 703 owing to a pressure difference between discharge pressure and intake pressure.

The gap portion of which the volume becomes its maximum, is a closed gap portion which communicates neither with the intake port 705 nor the discharge port 706. Therefore, it maintains the pressure difference between the discharge pressure and the intake pressure and plays an important role in the pump smoothly carrying out intake and discharge operations. Accordingly, when the oil leakage as mentioned above happens, smooth pump operation cannot be carried out. For example, there arise problems such that a rotating unit is locked and high pressure oil cannot be discharged.

Hence, according to, for example, Japanese Unexamined Utility Model Publication No. JP-U-5-6170, oil leakage is prevented by reducing the clearance between the outer rotor 702 and the inner rotor 701.

Specifically, a clearance L1 between the outer rotor 702 and the casing 704 at a vicinity of the position where the volume of the gap portion becomes its maximum, is made smaller than a clearance L2 between the outer rotor 702 and the casing 704 at a vicinity of the closed gap portion (having minimum volume) opposed to the closed gap portion having the maximum volume. As a result, the clearance between the outer rotor 702 and the inner rotor 701 at the closed gap portion having the maximum volume is prevented from widening. However, in this case, because of high pressure fluid leaking from the discharge port 706 to the outer periphery of the outer rotor 702, the outer rotor 702 is pushed to a portion of the inner face of the casing 704 (point P) on the right side of the drawing.

Generally, the outer rotor 702 and the inner rotor 701 have fabrication errors in fabrication steps. Therefore, heights (length in diameter direction) of the teeth of the inner teeth portion 702a and heights (length in diameter direction) of the teeth of the outer teeth portion 701a are different from each other, respectively. Therefore, in setting clearances among a drive shaft, the inner rotor 701, the outer rotor 702 and the casing 704, the clearances are set by, for example, a method in which a maximum height tooth of the inner teeth portion 702a engages with a maximum height tooth of the outer teeth portion 701a.

However, as mentioned above, heights of the teeth of the inner teeth portion 702a and the heights of the teeth of the outer teeth portion 701a are different from each other, respectively. Accordingly, when the closed gap portion having the maximum volume is formed by a tooth of the inner teeth portion 702a and a tooth of the outer teeth portion 701a which are shorter than the respective maximum height teeth thereof, a clearance is produced between the inner teeth portion 702a and the outer teeth portion 701a at the closed gap portion and oil leaks from the clearance.

Further, when the discharge pressure becomes high, force pushing the outer rotor 702 to the portion of the inner face of the casing 704 (vicinity of point P) on the right side of the drawing becomes large. Therefore, the pump may not be driven smoothly or the driving of the pump may be impossible since the outer rotor 702 are locked by being squeezed by the the casing 704 and the inner rotor 701.

SUMMARY OF THE INVENTION

The present invention has been made in view of the above-described problems and it is a first object of the present invention to provide a rotary pump capable of carrying out high pressure discharge by preventing fluid leakage and capable of being driven stably even when discharge pressure is high. Further, it is a second object of the present invention to provide a braking apparatus carrying out braking operation by using the rotary pump.

In a rotary pump according to a first aspect of the present invention, the outer rotor and the inner rotor are assembled in a casing such that, when a clearance between an inner teeth portion of an outer rotor and an outer teeth portion of an inner rotor is substantially nullified on a side of a first closed portion, which is a gap portion having a maximum volume, a clearance between the outer rotor and the casing on the outer periphery of the outer rotor on a side where the first closed portion is formed and a clearance between the outer rotor and the casing on a side where a second closed portion, which is the gap portion having a minimum volume is formed, become substantially an equivalent interval.

By such a constitution, an outer periphery of the outer rotor and an inner peripheral wall of the casing can be brought into contact with each other on the side of the second closed portion in view from the central axis of the inner rotor. Accordingly, even in a high pressure discharge operation, the outer rotor is not locked by being squeezed between the inner rotor and the casing and accordingly, the pump can be driven stably. Further, by torque transmitted from the inner rotor, the outer rotor is moved in a direction of contracting the clearance at the first closed portion. Accordingly, oil leakage between the outer teeth portion and the inner teeth portion at the first closed portion can be prevented.

Further, assembling operation may be carried out such that a clearance between the inner rotor and a drive shaft on the side where the first closed portion is formed may be set to be a half of the clearance between the inner rotor and the drive shaft.

The inner rotor and the outer rotor may be assembled in the casing such that a highest tooth portion of the inner teeth portion and a highest tooth portion of the outer teeth portion are disposed on a line defined by connecting the central axis of the outer rotor and the central axis of the inner rotor and on the side where the first closed portion is formed.

When the outer rotor and the inner rotor are rotated, teeth having the heights lower than the highest tooth portions of the inner teeth portion and the outer teeth portion, necessarily come on the line defined by connecting the central axis of the outer rotor and the central axis of the inner rotor and on the side where the first closed portion is formed. Accordingly, the outer periphery of the outer rotor and the inner peripheral wall of the casing can be brought into contact with each other on the side of the second closed portion in view from the central axis of the outer rotor. As a result, the pump can be driven stably without locking the outer rotor by being squeezed between the inner rotor and the casing even in the high pressure discharge operation.

Further, it is preferable to provide a low pressure side communicating path communicating the intake port and the outer periphery of the outer rotor on the side of the intake port and a high pressure side communicating path communicating the discharge port and the outer periphery of the outer rotor on the side of the delivery port. Thereby, pressures on the outer periphery and the inner periphery (teeth face side) of the outer rotor on the side of the discharge port as well as on the side of the intake port can be balanced. Accordingly, force of bringing the outer rotor in contact with the casing by oil pressure can be reduced and sliding resistance of the outer rotor can be reduced. That is, stable and excellent pump operation can be achieved with no locking and with small reduction in the rotational number of a drive motor.

It is also preferable to install first and second seal members for restraining flow of fluid in respective intermediaries between the high pressure side communicating path and the low pressure side communicating path on the outer periphery of the outer rotor.

In this way, by providing the first and the second seal members for sealing the high pressure portion from the low pressure portion on the outer periphery of the outer rotor, leakage of fluid from the high pressure portion to the low pressure portion can be prevented. Thereby, the volumetric efficiency of the pump can be promoted and at the same time, the above-described effect can further be promoted.

That is, by preventing leakage, pressures on the outer periphery and the inner periphery (teeth face side) of the outer rotor can be balanced further excellently.

Further, when the above-described rotary pump is applied to a braking apparatus, the rotary pump may be disposed in an auxiliary conduit while the intake port thereof is connected to the side of a brake fluid pressure generating device and the discharge port thereof is connected to the side of a braking force generating device. Further, instead of connecting the intake port to the brake fluid pressure generating device, for example, a master cylinder, it may be connected directly to a reservoir of the master cylinder.

In the braking apparatus having such a constitution, the brake fluid pressure within the auxiliary conduit becomes high when a braking operation is carried out by a driver. However, as mentioned above, even in the high pressure discharging operation, stable pumping operation can be carried out without causing oil leakage at the first closed portion and without the outer rotor locked by being squeezed between the inner rotor and the casing. Thereby, there can be provided a braking apparatus capable of excellently carrying out braking operation by using the above-described rotary pump.

In a rotary pump according to a second aspect of the present invention, a low pressure side communicating path for communicating an outer periphery of an outer rotor on a side of an intake port with a portion having a pressure equivalent to a pressure of the intake port and a high pressure side communicating path for communicating the outer periphery of the outer rotor on a side of a discharge port with the discharge port are formed in a casing. In particular, the low pressure side and high pressure side communicating paths are formed at positions for moving the outer rotor in a direction of pushing an outer teeth portion of an inner rotor forming a closed gap portion by an inner teeth portion of the outer rotor forming the closed gap portion.

When the outer rotor is moved in the direction of pushing the outer teeth portion of the inner rotor forming the closed gap portion by the inner teeth portion of the outer rotor forming the closed gap portion, a clearance between the inner teeth portion and the outer teeth portion are not widened by a difference between a pressure at the intake port and a pressure at the discharge port. Accordingly, when the positions of forming the low pressure side and high pressure side communicating paths are set for moving the outer rotor in the direction for pushing the outer teeth portion of the inner rotor forming the closed gap portion by the inner teeth portion of the outer rotor forming the closed gap portion, a clearance between the outer rotor and the inner rotor can be eliminated and leakage of fluid from the clearance can be prevented Further, the outer periphery of the outer rotor and the intake port can be communicated with each other by the low pressure side communicating path by selecting the intake port per se as a portion having pressure equivalent to pressure of the intake port.

Further, a specific position of forming the low pressure side communicating path is as follows. That is, in the case where the intake port is communicated with a plurality of gap portions, when the low pressure side communicating path is constituted by a first communicating path and a second communicating path, the first communicating path may be formed at a position where a gap portion adjacent to the closed gap potion among the plurality of gap portions communicating with the intake port, communicates with the outer periphery of the outer rotor and the second communicating path may be former at a position where a gap portion distant from the closed gap potion among the plurality of gap portions communicating with the intake port, communicates with the outer periphery of the outer rotor.

Meanwhile, as a specific position of the high pressure side communicating path, in the case where the discharge port is communicated with a plurality of gap portions, the high pressure side communicating path may; be formed at a position where a gap portion adjacent to the closed gap portion among the plurality of gap portions communicating with the discharge port, communicates with the outer periphery of the outer rotor.

When the above-described rotary pump is applied to a braking apparatus, in a braking apparatus having a main conduit for transmitting a brake fluid pressure from a brake fluid pressure generating device to a braking force generating device and an auxiliary conduit provided between the brake fluid pressure generating device and the braking force generating device in parallel to the main conduit, the rotary pump is installed at the auxiliary conduit so that an intake port thereof is directed to a side of the brake fluid pressure generating device and a discharge port thereof is directed to a side of the braking force generating device.

According to that braking apparatus, pressure of the braking fluid within the auxiliary conduit becomes high when a braking operation is carried out and the brake fluid pressure generating device generates the brake fluid of high pressure. At this time, a difference between pressure applied on the intake port and pressure applied on the discharge port becomes large. Therefore, leakage of the brake fluid is easy to occur from the clearance between the outer rotor and the inner rotor. However, the above-described rotary pump can prevent leakage of the brake fluid from the clearance. Thereby, it is possible to provide a braking apparatus capable of excellently carrying out braking operation by using the above-described rotary pump.

Further, according to the braking apparatus, the rotary pump can suck the brake fluid of a first fluid pressure from the side of the brake fluid pressure generating device, pressurize the brake fluid to a second fluid pressure larger than the first fluid pressure and deliver the brake fluid to the side of the braking force generating device. Therefore, it is preferable to provide, in the main conduit, a differential pressure maintaining device for maintaining a differential pressure between the second fluid pressure applied on the side of the braking force generating device and the first fluid pressure on the side of the brake fluid pressure generating device when the brake fluid pressure applied on the braking force generating device is made higher than the first fluid pressure by the rotary pump.

In this way, even in the case where high pressure discharge by the rotary pump is needed, as mentioned above, leakage of the brake fluid from the discharge port to the intake port can be prevented and the discharge efficiency can be promoted in high pressure discharge of the rotary pump.

In a rotary pump according to a third aspect of the present invention, a low pressure side communicating path for communicating an outer periphery of an outer rotor on a side of an intake port with the intake port and a high pressure side communicating path for communicating the outer periphery of the outer rotor on a side of a discharge port with the discharge port are formed in a casing. A first seal device for restraining flow of a fluid at an intermediary between the high pressure side communicating path and the low pressure side communicating path on the outer periphery of the outer rotor is provided therebetween on a side where a first closed gap portion is formed. A second seal device for restraining flow of the fluid at the intermediary between the high pressure side communicating path and the low pressure side communicating path on the outer periphery of the outer rotor is provided therebetween on a side where a second closed gap portion is formed.

A high pressure portion and a low pressure portion are present on the outer periphery of the outer rotor between the high pressure side communicating path and the low pressure side communicating path. Therefore, by installing the first and second seal devices between the high pressure side communicating path and the low pressure side communicating path on the outer periphery of the outer rotor, the high pressure portion can be separated from the low pressure portion. That is, because the first closed gap portion and the second closed gap portion are present between the high pressure side communicating path and the low pressure side communicating path, when the first and the second seal devices are installed respectively in correspondence therewith, leakage of the fluid from the high pressure portion to the low pressure portion on the outer periphery of the outer rotor can be prevented. Thereby, the volumetric efficiency of the rotary pump can be promoted and at the same time, the pump can be driven stably.

Each of the first and second seal devices can be constituted by a first seal member arranged on the side of the casing and a second seal member arranged on the side of the outer rotor. It is preferable to form the first seal member by a material having a hardness softer than that of the second seal member.

When the hardness of the first seal member is made softer than that of the second seal member, fabrication error of the outer rotor can be absorbed by the first seal member while ensuring the sealing performance for the fluid by the second seal member.

When the rotary pump is constituted such that an inner teeth portion of the outer rotor forming the first closed gap portion pushes an outer teeth portion of an inner rotor forming the first closed gap portion in driving the pump, it is preferable to install at least the first seal device for restraining flow of the fluid between the high pressure side communicating path and the low pressure side communicating path on the outer periphery of the outer rotor on the side where the first closed gap portion is formed.

When the rotary pump is constituted such that the inner teeth portion of the outer rotor forming the first closed gap portion pushes the outer teeth portion of the inner rotor forming the first closed portion, the outer rotor pushes the inner rotor. Accordingly, the outer rotor moves in the direction of pushing the inner rotor. As a result, the outer rotor and the casing are brought into contact with each other. Therefore, the sealing performance is achieved at the contact portion of the outer rotor and the casing. Therefore, even when the first sealing device is installed only on the side where the first closed gap portion is formed on the outer periphery of the outer rotor between the high pressure side communicating path and the low pressure side communicating path, leakage of fluid from the high pressure portion to the low pressure portion on the outer periphery of the outer rotor can be prevented and an effect similar to that of the above-described can be achieved.

In the above-described constitution, the second seal device for restraining flow of the fluid between the high pressure side communicating path and the low pressure side communicating path on the outer periphery of the outer rotor may be installed on the side where the second closed gap portion is formed.

When the second seal device is installed on the side where the second closed gap portion is formed on the outer periphery of the outer rotor between the high pressure side communicating path and the low pressure side communicating path, the sealing performance can be ensured further firmly than in the case wherein the sealing performance is ensured by a portion where the outer rotor and the casing are brought into contact with each other. Therefore, leakage of fluid from the high pressure portion to the low pressure portion on the outer periphery of the outer rotor can further effectively be prevented.

Specifically, by arranging the first seal device between the first closed gap portion and the low pressure side communicating path on the outer periphery of the outer rotor, the outer rotor can be moved in the direction of pushing the outer teeth portion of the inner rotor forming the first closed gap portion by the inner teeth portion of the outer rotor forming the first closed gap portion.

Further, when the first seal device is arranged at the above-described position, by installing a third seal device for restraining flow of the fluid between the high pressure side communicating path and the second closed gap portion on the outer periphery of the outer rotor therebetween, the outer rotor can be moved in the above-described direction further effectively.

That is, when the third seal device is installed between the high pressure side communicating path and the second closed gap portion on the outer periphery of the outer rotor, pressure of the outer periphery of the outer rotor on a side where the first closed gap portion is formed becomes higher than pressure thereof on a side where the second closed gap portion is formed. The outer rotor is easy to move by that pressure difference and the inner teeth portion of the outer rotor forming the first closed gap portion can push the outer teeth portion of the inner rotor forming the first closed gap portion further strongly.

Further, each of the first, second and third seal device can be constituted by a first seal member arranged on the side of the casing and a second seal member arranged on the side of the outer rotor. It is preferable that hardness of the first seal member is made softer than that of the second seal member as described above.

It is preferable that recessed portions constituting the communicating paths between each of the intake port and the discharge port and the outer periphery of the outer rotor are formed on a face opposed to the outer peripheral portion of the outer rotor in wall faces of the casing constituting a chamber for containing the inner and outer rotors.

By forming the recessed portions constituting the communicating paths in this way, even when fluid is dragged by the outer periphery of the outer rotor during the rotation of the outer rotor, pressure of the fluid on the outer periphery of the outer rotor can be made uniform. Thereby, a rotary pump having further stable and excellent pump function can be constituted.

Further, when the casing is constituted by a central plate and first and second side plates interposing the center plate, the communicating paths can be formed by chamfering corner portions of a hole of the central plate or by forming a groove portion in the peripheral direction of the hole on a wall face forming the hole of the central plate.

Further, the rotary pump according to the third aspect of the present invention is also applicable to a brake apparatus in a similar manner with the rotary pumps according to the first and the second aspects.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 14 through 21A and 21B are explanatory views showing other embodiments of seal members.

DETAILED DESCRIPTION OF THE PREFERRED EMBODIMENTS

First Embodiment

Figure 1:
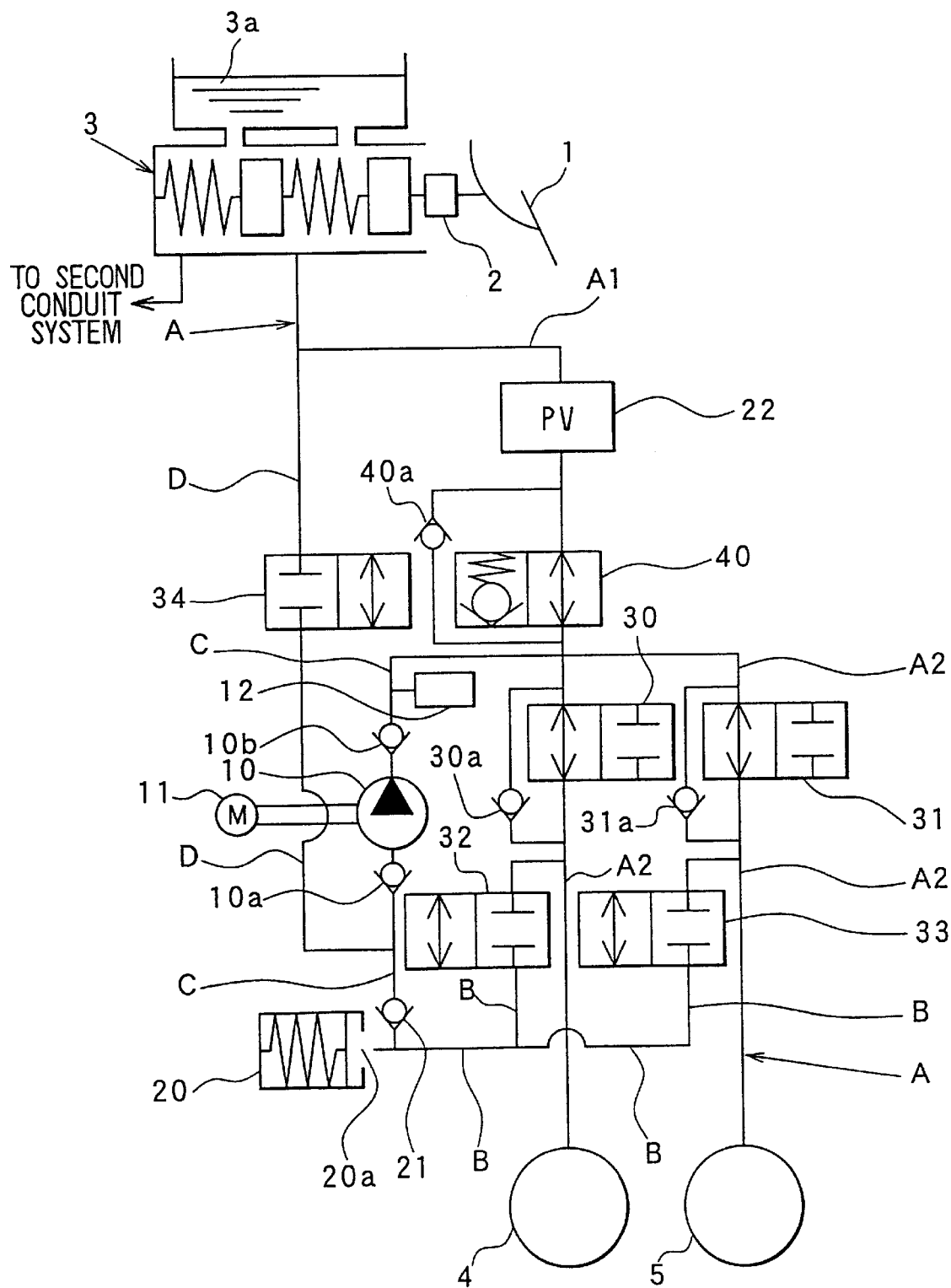
FIG. 1 is a schematic view of a brake apparatus to which a rotary pump 10 is applied.

FIG. 1 shows an outline structure of a brake apparatus to which a trochoid pump is applied as a rotary pump. The basic constitution of the brake apparatus will be described with reference to FIG. 1. In this embodiment, a brake apparatus is applied to a vehicle provided with a hydraulic circuit of a diagonal conduit system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. Brake depression force (brake pedal stroke) is boosted by the booster 2.

Further, the booster 2 is provided with a rod for transmitting boosted depression force to a master cylinder 3. In detail, the master cylinder 3 generates master cylinder pressure when the rod pushes a master piston arranged in the master cylinder 3. The brake pedal 1, the booster 2 and the master cylinder 3 correspond to a brake fluid pressure generating device.

The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a right front wheel (FR) and a wheel cylinder 5 for a left rear wheel (RL) via a brake assist system provided with a function of an antilock brake system (hereinafter, referred to as ABS). In the following explanation, the brake assist system will be described with respect to the hydraulic circuit in the first conduit connecting the wheel cylinders of a front right wheel (FR) and a rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit (main conduit) A connected to the master cylinder 3. A proportioning valve (PV) 22 is disposed in the main conduit A. The main conduit A is divided into two portions A1, A2 by the proportioning valve 22. That is, the main conduit A is divided into a first conduit A1 from the master cylinder 3 to the proportioning valve 22 and a second conduit A2 from the proportioning valve 22 to the respective wheel cylinders 4 and 5.

The proportioning valve 22 has a function of transmitting a reference pressure of a brake fluid to the downstream side with a predetermined attenuation rate when the braking fluid flows in the positive direction (in this embodiment, a direction from the side of the wheel cylinder to the side of the master cylinder is the positive direction). That is, by inversely connecting the proportioning valve 22 as shown in FIG. 1, pressure of the brake fluid on the side of the second conduit A2 becomes the reference pressure. Accordingly, when the brake fluid flows from the side of the wheel cylinder to the side of the master cylinder via the proportioning valve 22, if pressures of the wheel cylinder and the master cylinder are higher than a well-known property changing point pressure which is preset in the proportioning valve 22, the pressure corresponding to the wheel cylinder pressure attenuated with the predetermined attenuation rate becomes the master cylinder pressure. The proportioning valve 22 realizing such an operation functions as a differential pressure control valve for holding differential pressure between the mater cylinder 3 and the side of the wheel cylinders 4 and 5 such that the pressure on the side of the wheel cylinders is higher than that of the master cylinder 3.

Further, the second conduit A2 branches in two conduits. A pressure increasing control valve 30 for controlling an increase of brake fluid pressure of the wheel cylinder 4 is installed to one of the branched conduits and a pressure increasing control valve 31 for controlling an increase of brake fluid pressure of the wheel cylinder 5 is installed to the other thereof.

The pressure increasing control valves 30 and 31 are two-position valves capable of controlling communicating and cut-off states by an electronic control unit (hereinafter, referred to as ECU). When the two-position valves are controlled to a communicating state, the master cylinder pressure or the brake fluid pressure produced by a pump 10 can be applied to the respective wheel cylinders 4 and 5.

In the normal braking operation where pressures in the wheel cylinders are not controlled by the ECU as in the case where pressure reduction of the wheel cylinder pressure is not carried out, the pressure increasing control valves 30 and 31 are always controlled in the communicating state. Safety valves 30a and 31a are installed in parallel with the pressure increasing control valves 30 and 31, respectively. The safety valves 30a and 31a allows the brake fluid to swiftly return from the wheel cylinders 4 and 5 to the master cylinder 3 when ABS control has been finished by stopping depression of the brake pedal 1.

Pressure reducing control valves 32 and 33 capable of controlling communicating and cut-off states by the ECU are respectively arranged at conduits B connecting the second conduits A2 between the pressure increasing control valves 30 and 31 and the wheel cylinders 4 and 5, and a reservoir port 20a of a reservoir 20. In the normal braking operation, the pressure reducing control valves 32 and 33 are always brought into a cut-off state.

A rotary pump 10 is arranged at a conduit C connecting the second conduit A2 between the proportioning valve 22 and the pressure increasing control valves 30 and 31 and the reservoir hole 20a of the reservoir 20. Safety valves 10a and 10b are disposed in the conduit C on both sides of the rotary pump 10. The safety valves 10a and 10b may be built in the rotary pump 10. A motor 11 is connected to the rotary pump 10 to drive the rotary pump 10. A detailed explanation of the rotary pump 10 will be given later.

A damper 12 is arranged on the discharge side of the rotary pump 10 in the conduit C to alleviate pulsation of the brake fluid delivered by the rotary pump 10. An auxiliary conduit D is installed to connect the conduit C between the reservoir 20 and the rotary pump 10, and the master cylinder 3. The rotary pump 10 scoops up the brake fluid of the first conduit A1 via the auxiliary conduit D and discharges it to the second conduit A2, whereby the brake fluid pressures of the wheel cylinders 4 and 5 are made higher than the master cylinder pressure. As a result, wheel braking forces of the wheel cylinders 4 and 5 are increased.

A control valve 34 is installed in the auxiliary conduit D. The control valve 34 is always brought into a cut-off state in the normal braking operation.

A check valve 21 is arranged between a connection point of the conduit C and the auxiliary conduit D and the reservoir 20 to prevent the brake fluid drawn via the auxiliary conduit D from reversely flowing to the reservoir 20.

A control valve 40 is disposed between the proportioning valve 22 and the pressure increasing control valves 30 and 31 in the second conduit A2. The control valve 40 is normally controlled in a communicating state. However, the control valve 40 switched to a cut-off state to hold differential pressure between the master cylinder pressure and the wheel cylinder pressure when the vehicle is to be rapidly braked even though the master cylinder pressure is lower than the property changing point pressure of the proportioning valve 22. Also, the control valve 40 is switched to the cut-off state when traction control (TRC) is carried out. As a specific example that the vehicle is to be rapidly braked by cutting off the control valve 40, for example, there is a case where the boosting function of the booster 2 is lowered or lost.

Figure 2A:
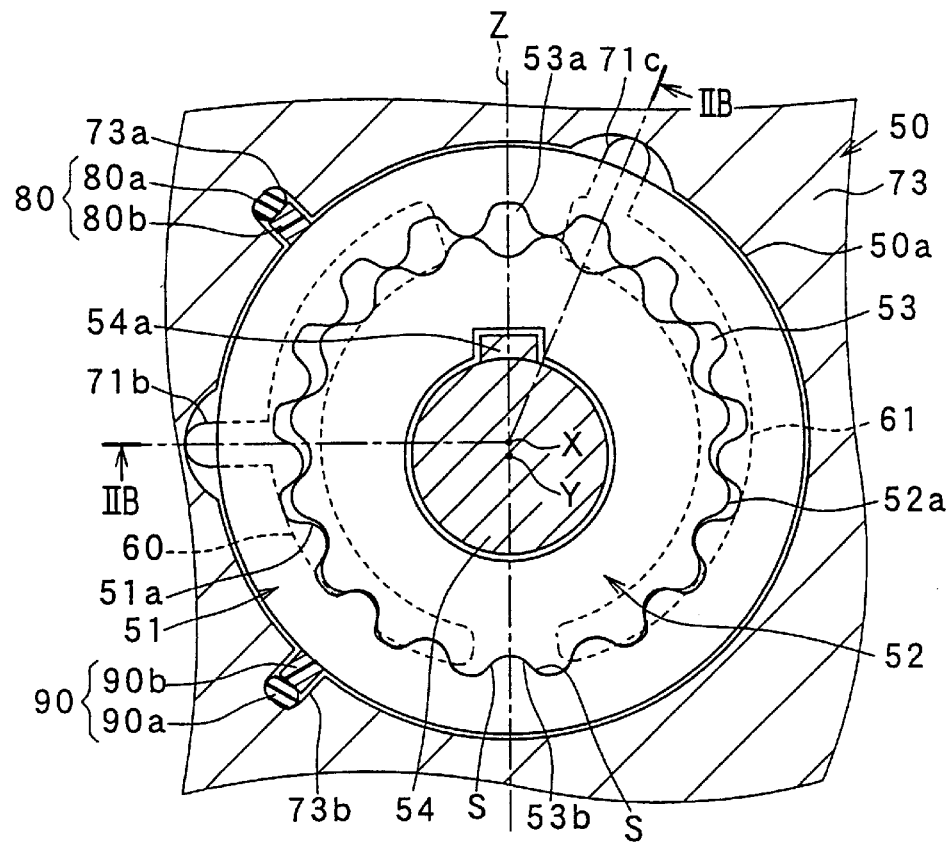
FIG. 2A is a schematic view of the rotary pump 10 and FIG. 2B is a sectional view taken from a line IIB—IIB of FIG. 2A.
Figure 2B:
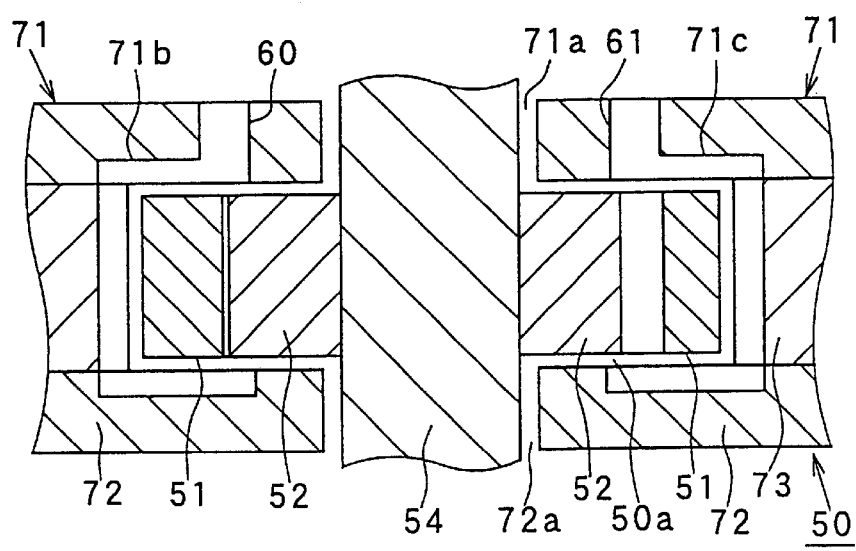

FIG. 2A is a schematic view of a rotary pump 10 and FIG. 2B is a sectional view taken along a line IIB—IIB of FIG. 2A. First, the structure of the rotary pump 10 will be described with reference to FIGS. 2A and 2B.

An outer rotor 51 and an inner rotor 52 are contained in a rotor chamber 50a of a casing 50 of the rotary pump 10. The outer rotor 51 and the inner rotor 52 are assembled in the casing 50 in a state where respective central axes (point X and point Y in the drawing) are shifted from each other. The outer rotor 51 is provided with an inner teeth portion 51a at its inner periphery. The inner rotor 52 is provided with an outer teeth portion 52a at its outer periphery. The inner teeth portion 51a of the outer rotor 51 and the outer teeth portion 52a of the inner rotor 52 form a plurality of gap portions 53 and are in mesh with each other at mesh faces S. Projections of the teeth portion 52a of the inner rotor 52 are formed in a rounded shape of a shape of a circular arc different from a normal trochoid parallel curve.

As is apparent from FIG. 2A, the rotary pump 10 is a pump of a multiple teeth trochoid type having no partition plate (crescent) in which the gap portions 53 are formed by the inner teeth portion 51a of the outer rotor 51 and the outer teeth portion 52a of the inner rotor 52. The inner rotor 52 and the outer rotor 51 share a plurality of contact points (that is, contact faces) at the mesh faces S in order to transmit rotation torque of the inner rotor 52 to the outer rotor 51.

As shown by FIG. 2B, the casing 50 is constituted by a first side plate 71 and a second side plate 72 arranged to interpose the two rotors 51 and 52 therebetween and a central plate 73 arranged between the first and the second side plates 71 and 72. A hole is formed in the central plate 73 to contain the outer rotor 51 and the inner rotor 52.

Center holes 71a and 72a communicating with inside of the rotor chamber 50a are formed at central portions of the first and second side plates 71 and 72. A drive shaft 54 for driving the inner rotor 52 is fitted into the center holes 71a and 72a. The drive shaft 54 is provided with a key 54a, whereby drive force is transmitted from the drive shaft 54 to the inner rotor 52 via the key 54a. The outer rotor 51 and the inner rotor 52 are rotatably arranged in the hole of the central plate 73. That is, a rotating unit constituted by the outer rotor 51 and the inner rotor 52 is rotatably incorporated in the rotor chamber 50a of the casing 50. The outer rotor 51 rotates with point X as a rotation axis and the inner rotor 52 rotates with point Y as a rotation axis.

When a line running on both point X and point Y respectively corresponding to the rotation axes of the outer rotor 51 and the inner rotor 52 is defined as a center line Z of the rotary pump 10, an intake port 60 and a discharge port 61 both of which communicate with the rotor chamber 50a are formed on the left and right sides of the center line Z in the first side plate 71. The intake port 60 and the discharge port 61 are arranged at positions communicating with the plurality of gap portions 53. The brake fluid from outside can be sucked into the gap portions 53 via the intake port 60 and the brake fluid in the gap portions 53 can be discharged to outside via the discharge port 61.

A first closed gap portion 53a of which the volume is its maximum and a second closed gap portion 53b of which the volume is its minimum among the plurality of gap portions 53, are substantially prevented from communicating with both of the intake port 60 and the discharge port 61. Therefore, differential pressure between intake pressure at the intake port 60 and discharge pressure at the discharge port 61 is maintained by the first and second closed gap portions 53a and 53b.

The first side plate 71 is provided with a communicating path 71b for communicating the outer periphery of the outer rotor 51 with the intake port 60 and a communicating path 71c for communicating the outer periphery of the outer rotor 51 with the discharge port 61. The communicating path 71b is arranged at a position advanced from the center line Z in a direction to the intake port 60 by about 90° centering on point X constituting the rotation axis of the outer rotor 51. The communicating path 71c is formed to communicate the gap portion 53 most adjacent to the first closed gap portion 53a in the plurality of gap portions 53 communicating with the discharge port 61 with the outer periphery of the outer rotor 51. Specifically, the communicating path 71c is arranged at a 20 position advanced from the center line Z in a direction to the discharge port 61 by about 22.5° centering on point X.

Recessed portions 73a and 73b are formed on a wall face of the central plate 73 forming the rotor chamber 50a at a position advanced from the center line Z to the direction of the intake port 60 by about 45° and at a position advanced therefrom by about 135° centering on point X constituting the rotation axis of the outer rotor 51. Seal members 80 and 90 are respectively installed in the recessed portions 73a and 73b to restrain the brake fluid from flowing in the outer periphery of the outer rotor 51. Specifically, the seal members 80 and 90 are arranged respectively at intermediaries between the communicating paths 71b and 71c and on the side of the intake port 60. The seal members 80 and 90 separate, in the clearance between the outer rotor and the central plate, a portion in which pressure of the brake fluid is low from a portion in which pressure of the brake fluid is high. However, in the present embodiment, the sealing performance between the first and second side plates and the inner and outer rotors is sufficiently ensured at both planes of the outer rotor in contact with the side plates. In order to ensure the sealing performance at these planes, the clearances between the first and second side plates and the inner and outer rotors may be reduced as less as possible or seal members may be inserted in the clearances.

The seal members 80 and 90 are constituted by rubber members 80a and 90a substantially in a shape of a circular cylinder and resin members 80b and 90b made of Teflon in a shape of a cube. The resin members 80b and 90b are biased by the robber members 80a and 90a to be brought into contact with the outer rotor 51. That is, more or less error amount is caused in the size of the outer rotor 51 by fabrication error or the like. Accordingly, the error amount can be absorbed by the rubber members 80a and 90a having elastic force.

The width of the resin member 80b is set to produce a clearance to some degree in the recessed portion 73a when the resin member 80b is arranged in the recessed portion 73a. That is, if the width of the resin member 80b is formed equivalently to the width of the recessed portion 73a, when the resin member 80b enters the recessed portion 73a by flow of the brake fluid in driving the pump, the resin member 80b is difficult to come out therefrom. Hence, the resin member 80b is formed with a width to a degree of producing more or less clearance. As a result, because the brake fluid can enter the upper portion of the recessed portion 73a, the resin member 80b is easy to come out from the recessed portion 73a by pressure of the brake fluid entering the upper portion of the recessed portion 73a.

Figure 3:
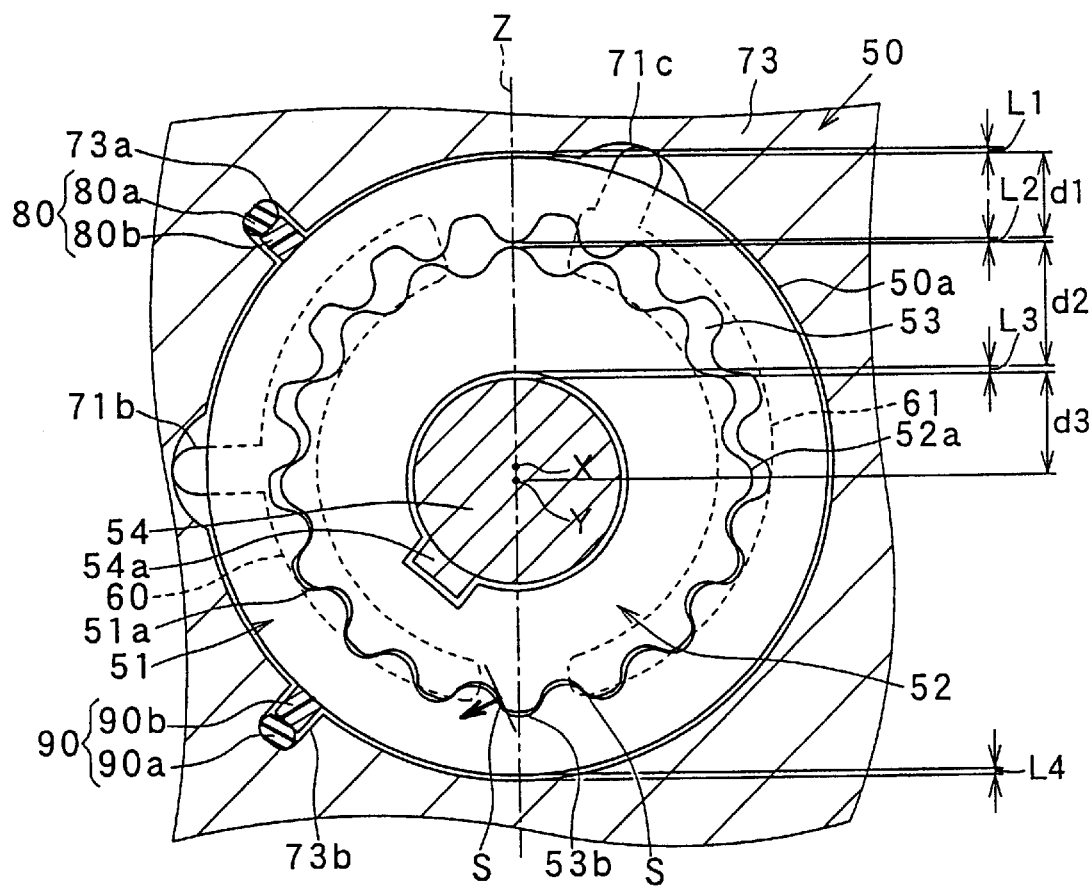
FIG. 3 is a view for explaining the assembled state of the rotary pump 10 shown in FIGS. 2A and 2B.

The rotary pump 10 having such a structure is assembled to have an arrangement relationship shown in FIG. 3. An explanation will be given of the arrangement relationship along with assembling of the rotary pump 10.

The rotary pump 10 is assembled by arranging the drive shaft 54, the inner rotor 52 and the outer rotor 51 in the hole of the central plate 73 (arranged in the order of inner rotor 52—outer rotor 51) and thereafter fixing the central plate 73 to the first and second side plates 71 and 72. As a fixing method therefor, the central plate 73 and the respective side plates 71 and 72 may be fixed by screws or may be fixed at outer peripheral faces of the central plate 73 and the respective side plates 71 and 72 using laser welding or the like.

The drive shaft 54, the inner rotor 52 and the outer rotor 51 are arranged in the central plate 73 with more or less clearances therebetween. Specifically, as shown in FIG. 3, a clearance between the outer rotor 51 and the central plate 73 on the center line Z in the vicinity of the first closed gap portion 53a is defined as an interval L1, a clearance between a front end of a tooth of the outer rotor 51 and a front end of a tooth of the inner rotor 52 on the center line Z is defined as an interval L2, a clearance between the drive shaft 54 and the inner rotor 52 is defined as interval L3 and a clearance between the outer rotor 51 and the central plate 73 on the center line Z in the vicinity of the second closed gap portion 53b is defined as interval L4. According to the present embodiment, assembling of the rotary pump 10 is carried out in such a manner that on the center line Z, the interval L2 is nullified, the interval L3 is set to a half of a difference between an inner diameter of the inner rotor 52 and an outer diameter of the drive shaft 54, and the intervals L1 and L4 are substantially equivalent to each other. That is, by setting the interval L1 and the interval L4 substantially equivalent to each other, an outer peripheral wall of the outer rotor 51 is prevented from being brought into contact with an upper portion and a lower portion of an inner peripheral wall of the central plate 73.

However, a height (length in diameter direction) d1 of the inner teeth portion 51a formed in the outer rotor 51 and a height d2 of the outer teeth portion 52a formed in the inner rotor 52 may be varied by fabrication error. Therefore, it is preferable that the above-described arrangement relationship is made to be satisfied in a state in which a tooth of the inner teeth portion 51a having the largest height d1max and a tooth of the outer teeth portion 52a having the largest height d2max are arranged so as to form the first closed gap portion 53a (on center line Z).

That is, consider the center of the drive shaft (center of inner rotor) as an origin (0, 0) and regard the center line Z as Y axis. Then, Y coordinate Py of the inner peripheral wall of the central plate 73 intersecting with the center line Z at an upper portion of the drawing is expressed by the following equation (1).

$$Py = d3 + S/2 + d2max + 0 + d1max + G/2 \qquad \text{(Equation 1)}$$

where an outer peripheral clearance (diameter of inner peripheral wall of central plate 73—outer diameter of outer rotor 51) is designated by notation G and an inner diameter clearance of the inner rotor 52 (inner diameter of inner rotor 52—outer diameter of drive shaft 54) is designated by notation S. Therefore, S/2 in the right side of the equation corresponds to the set value of the interval L3, 0 (null) corresponds to the set value of the interval L2, and G/2 corresponds to the set value of the interval L1.

Further, the outer peripheral clearance G is set as follows.

An amount of movement of the outer rotor 51 depends on fabrication error of the inner teeth portion 51a of the outer rotor 51 and fabrication error of the outer teeth portion 52a of the inner rotor 52. Specifically, considering a maximum value of the amount of movement of the outer rotor 51 to the lower side of the drawing, the outer rotor 51 is positioned on the uppermost side of the drawing when a tooth of the inner teeth portion 51a having a height of d1max and a tooth of the outer teeth portion 52a having a height of d2max are disposed on the center line Z to form the first closed gap portion 53a, and the outer rotor 51 is positioned on the lowermost side of the drawing when a tooth of the inner teeth portion 51a having a minimum height of d1min and a tooth of the outer teeth portion 52a having a minimum height of d2min are disposed on the center line Z to form the first closed gap portion 53a, and accordingly, a differential amount therebetween becomes a maximum value of the amount of movement of the outer rotor 51.

Therefore, the outer peripheral clearance G needs to be set in consideration of the maximum value of the amount of movement of the outer rotor 51 so that the outer rotor 51 is not brought into contact with an upper half portion of the inner peripheral wall of the central plate 73. Therefore, according to the present embodiment, in consideration of the movement of the outer rotor 51 owing to fabrication error, the interval L1 and the interval L4 are set to be equal to or larger than the maximum value of the amount of movement of the outer rotor 51. That is, the outer peripheral clearance G is set at least twice as much as the amount of movement of the outer rotor 51.

If the assembling of the rotary pump 10 is carried out to satisfy the above-described arrangement relationship in a state where a tooth other than the tooth of the inner teeth portion 51a having the maximum height of d1max and a tooth other than the tooth of the outer teeth portion 52a having the maximum height of d2max are arranged at the position to form the first closed gap portion 53a, when a sum of the height of the inner teeth portion 51a and the height of the outer teeth portion 52a becomes larger than an initial value, the outer rotor 51 is lifted by the differential amount. However, the situation can be prevented by assembling the rotary pump 10 in accordance with the above-described arrangement relationship.

Also, there is a possibility in which, by fabrication errors of the inner teeth portion 51a of the outer rotor 51 and the outer teeth portion 52a of the inner rotor 52, the inner teeth portion 51a and the outer teeth portion 52a are brought into contact with each other previously at a gap portion other than the first closed gap portion 53a. In this case, a clearance is caused between the inner teeth portion 51a and the outer teeth portion 52a at the first closed gap portion 53a. However, as described above, the projection of the outer teeth portion 52a of the inner rotor 52 is formed in the rounded shape. Accordingly, the outer teeth portion 52a of the inner rotor does not substantially receive influence by fabrication error. As a result, a clearance can be prevented from causing at the first closed gap portion 53a.

Next, an explanation will be given of operation of the brake apparatus and the rotary pump 10 constituted as mentioned above.

The control valve 34 provided in the brake apparatus is pertinently brought into a communicating state when high pressure brake fluid needs to be supplied to the wheel cylinders 4 and 5, for example, when braking force in correspondence with depressing force of the brake pedal 1 cannot be obtained because of failure of the booster 2, or when an amount of operating the braking pedal 1 is large. When the control valve 34 is switched in the communication state, the master cylinder pressure generated by depressing the brake pedal 1 is applied to the rotary pump 10 via the auxiliary conduit D.

In the rotary pump 10, the inner rotor 52 is rotated in accordance with rotation of the drive shaft 54 by driving the motor 11. In response to rotation of the inner rotor 52, the outer rotor 51 is also rotated in the same direction by the mesh between the inner teeth portion 51a and the outer teeth portion 52a. At this time, the volume of each of the gap portions 53 is changed from large to small or vice versa during a time period in which the outer rotor 51 and the inner rotor 52 make one turn. Therefore, the brake fluid is sucked from the intake port 60 and is discharged from the discharge port 61 to the second conduit A2. Pressures of the wheel cylinders can be increased using the discharged brake fluid.

In this way, the rotary pump 10 can carry out a basic pumping operation in which the brake fluid is sucked from the intake port 60 and is discharged from the discharge port 61 by rotation of the rotors 51 and 52.

In this case, the rotary pump 10 is constituted as described above and the intervals L1, L2, L3 and L4 are under the above-described relationship. Therefore, action of the brake fluid pressure and transmission of torque from the inner rotor 52 are carried out as follows.

First, the intake port 60 and the discharge port 61 are respectively filled with the brake fluid having low intake pressure and the brake fluid having high discharge pressure. The low intake pressure is the master cylinder pressure. A portion of the outer periphery of the outer rotor 51 on the side of the intake port 60 is brought under the low intake pressure by the brake fluid communicating therewith via the communicating path 71*b*. A portion of the outer periphery of the outer rotor 51 on the side of the discharge port 61 is brought under the high discharge pressure by the brake fluid communicating therewith via the communicating path 71*c*.

The brake fluid of high pressure acts on the inner peripheral face of the outer rotor 51 on the right side rather than the center line Z of the drawing and the brake fluid of low pressure acts on the inner peripheral face thereof on the left side rather than the center line Z. On the outer peripheral face of the outer rotor 51, a portion to which the brake fluid of high pressure is applied (long peripheral portion including communicating path 71*c*) and a portion to which the brake fluid of low pressure is applied (short peripheral portion including communicating path 71*b*) are formed by the seal members 80 and 90. Therefore, in the lateral direction of drawing, pressures of the brake fluids acting on the inner and the outer peripheral faces of the outer rotor 51 are balanced respectively at the right side portion and the left side portion of the outer rotor 51. In the vertical direction of the drawing, pressure of the brake fluid acting on the outer peripheral face becomes higher than pressure of the brake fluid acting on the inner peripheral face of the outer rotor 51 at respective regions from the center line Z to the seal members 80 and 90. However, in view of the outer rotor 51 as a whole, forces respectively equal with each other are applied from the upper side and the lower side of the outer rotor 51 and accordingly, they are canceled by each other.

By the pressure relationship as described above, the outer rotor 51 is brought into a substantially balanced state in pressure in respect of vertical direction and the lateral direction of the drawing. Therefore, the outer rotor 51 receives substantially no force causing movement thereof from pressure of the brake fluid. Because pressures applied on the outer rotor 51 in the vertical direction and the lateral direction of paper face are balanced, sliding resistance caused by friction between the outer periphery face of the outer rotor 51 and the inner periphery face of the central plate 73 is reduced. As a result, the rotary pump 10 can be driven stably and with excellent balance. It is to be noted that the balance of the brake fluid pressure applied to the outer rotor 51 in the vertical direction of the drawing is achieved by arranging the respective seal members 80 and 90 with excellent balance with respect to the delivery port and the intake port. However, actually, force for rotating the outer rotor 51 is applied to the outer rotor 51 from the inner rotor via the mesh faces S. Therefore, the force acts on the outer rotor 51 in a direction of a skewed left lower side of the drawing (toward the recessed portion 73*b*). Therefore, when the rotary pump 10 is in motion, the clearance between the central plate 73 and the outer rotor 51 may be reduced on the lower left side of the outer rotor 51 in the drawing.

In detail, when the drive shaft 54 is driven by the motor 11, the torque of the inner rotor 52 acts on the outer rotor 51 in a direction orthogonal to a tangential line at a location where the inner rotor 52 and the outer rotor 51 are in mesh with each other, that is, in a left lower direction of the drawing as shown by an arrow mark in FIG. 3. Therefore, even when the height of the inner teeth portion 51*a* and the height of the outer teeth portion 52*a* are varied by fabrication error, the torque acting on the outer rotor 51 in the left lower direction of the drawing moves the outer rotor 51 to the lower side of the drawing, whereby the interval (clearance) L2 is reduced.

Accordingly, the clearance at the first closed gap portion 53*a* formed by the outer rotor 51 and the inner rotor 52 can be substantially nullified. The brake fluid can be prevented from leaking from the discharge port 61 to the intake port 60 via the clearance.

Further, in the present embodiment, the communicating paths 71*b* and 71*c* are provided. As a result, as mentioned above, there causes the low pressure portion and the high pressure portion at the outer periphery of the outer rotor 51. Therefore, the brake fluid may leak from the high pressure portion to the low pressure portion via the clearance between the outer periphery of the outer rotor 51 and the inner wall of the casing 73. However, the brake-fluid leakage is prevented by the seal members 80 and 90 formed between the communicating path 71*b* and the communicating path 71*c* at the outer periphery of the outer rotor 51.

That is, the low pressure portion and the high pressure portion at the outer periphery of the outer rotor 51 are separated from each other by the seal members 80 and 90. Accordingly, the brake-fluid leakage is not caused from the high pressure portion on the side of the discharge port 61 to the low pressure portion on the side of the intake port 60. As a result, the pressure balance between the inner periphery and the outer periphery of the outer rotor 51 is maintained and the pump can be driven stably.

Figure 22:
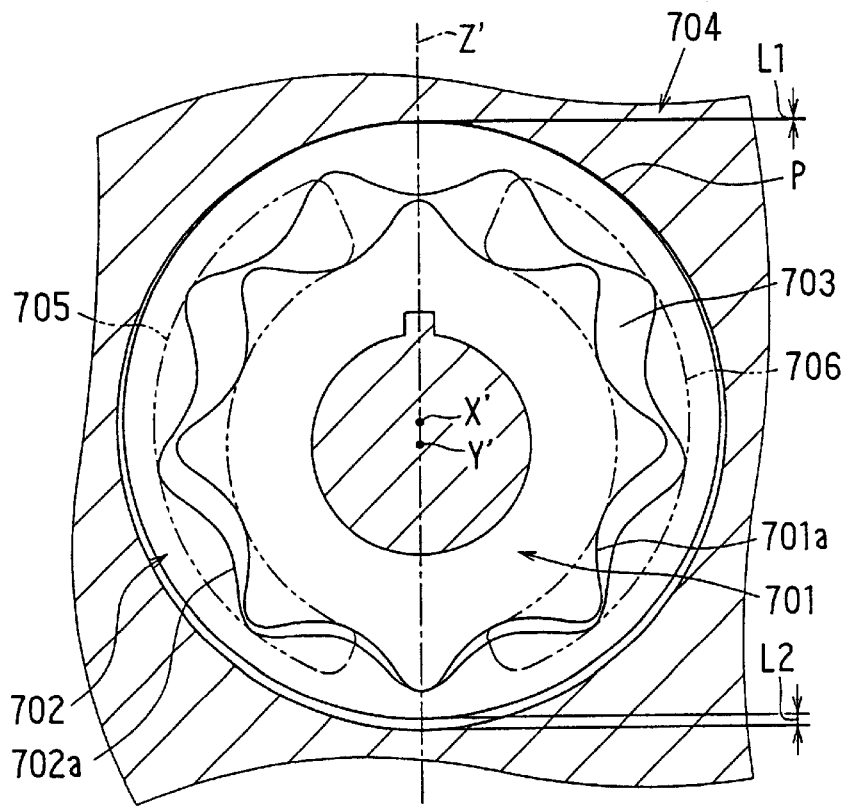
FIG. 22 is a schematic view of a conventional rotary pump.

Further, in the conventional trochoid pump shown in FIG. 22, although the pump can be driven when the discharge pressure is low, when the discharge pressure is high, the pump cannot be driven since the outer rotor is locked by being squeezed between the inner rotor 701 and the inner wall of the casing 704 and cannot rotate. That is, since in the high pressure discharge operation, pressure of the discharge port 703 becomes high, pressure on the outer periphery of the outer rotor 702 on the side of the intake port 705 also becomes high by leakage of oil from the discharge port 706. Therefore, the outer rotor 702 is strongly pushed in the right direction of the drawing. As a result, the outer rotor 702 and the casing 704 are brought into contact with each other at a position above the center of the casing 704 (vicinity of point P). As a result, strong force heading for the lower side of the drawing is applied on the outer rotor 702 at the position in the vicinity of the point P from the casing 704. On the other hand, when the outer rotor 702 moves in the right direction of the drawing, relative relationship between the outer rotor 702 and the inner rotor 701 is changed. As a result, the outer rotor 702 receives force heading for the upper side of the drawing from the inner rotor 701.

Therefore, the outer rotor 702 is brought into a state in which it is squeezed by the force heading for the upper side of the drawing which is applied from the inner rotor 701 and the force heading for the lower side of the drawing which is applied from the casing 704. As a result, the outer rotor 702 is locked and therefore the rotating unit of the pump cannot rotate.

In this respect, the rotary pump 10 of the present embodiment can be stably driven and achieve excellent performance without being locked even in the high pressure discharge operation (20–30 MPa) owing to two factors in which the outer periphery of the outer rotor 51 and the inner peripheral wall of the casing 50 are brought into contact with each other on the side of the second closed gap portion 53b rather than the central axis of the outer rotor 51, and sliding resistance between the outer rotor 51 and the casing 50 is reduced since pressure balance on the inner and outer peripheries of the outer rotor 51 is maintained.

In the first embodiment described with reference to FIGS. 1 to 3, the seal members 80 and 90, recessed portions 73a and 73b, and communicating paths 71c and 71d can be omitted. In this case, if the fabrication error can be made as less as possible, the outer rotor 51 is brought into contact with the inner peripheral face of the central plate 73 on the right side of the drawing, that is, on the side of the discharge port 61 at a vicinity of a point on a straight line substantially connecting respective centers of the discharge port 61 and the intake port 60. This is because high pressure brake fluid leaking from the discharge port 61 to the outer periphery of the outer rotor 51 moves the outer rotor 51 in a direction of the right side of the drawing.

It is to be noted that, even when the fabrication error is not present, since an operational force (pressing force) acting on the outer rotor 51 at the mesh faces S is directed to the lower side of the drawing, the point where the outer rotor 51 and the central plate 73 are brought into contact with each other shifts to the right lower side of the drawing, that is, to the side of the second closed gap portion 53b.

In a state where the above-described fabrication error is present, the larger the fabrication error, the more the point where the outer rotor 51 and the central plate 73 are brought into contact with each other, is moved from the position on the side of the discharge port 61, to the lower side of the drawing, that is, to the side of the second closed gap portion 53b owing to the operational force applied from the inner rotor 52.

When the contact point of the outer rotor 51 and the central plate 73 is in a range from the position corresponding to the middle of the discharge port 61 to the position shifted to the side of the second closed gap portion 53b, the outer rotor 51 is not squeezed by the inner rotor 52 and the central plate 73 and therefore, the rotating unit of the pump can smoothly rotate.

The brake apparatus explained above is provided with a function of carrying out brake assisting operation. According to the brake assisting operation, when sudden braking operation is carried out as in panic of a passenger, braking force higher than braking force in proportion to brake operating force by a driver, that is, the wheel cylinder pressure higher than the master cylinder pressure is generated and applied to the respective wheel cylinders. Specifically, the brake assisting operation is started when depression stroke, depression speed or depression acceleration of the brake pedal is equal to or higher than a reference value in the case where deceleration of the vehicle body exceeds a predetermined value (for example, 0.4 G). At that time, the rotary pump begins to be driven. The wheel cylinder pressure may be maintained higher than the master cylinder pressure by using a linear differential pressure control valve or a two-position valve equivalent to the pressure increasing control valve 30 in place of the proportioning control valve 22 mentioned above. That is, only the control valve 40 may be installed by dispensing with the proportioning valve 22.

Further, the control valve 34 can be dispensed with. In that case, there may be installed in a reservoir a mechanism in which the rotary pump 10 sucks the brake fluid from the reservoir to reduce the brake fluid in the reservoir when the brake fluid is accumulated in the reservoir by carrying out antiskid control or the like and sucks the brake fluid from the side of the master cylinder only when the amount of the brake fluid in the reservoir is equal to or lower than a predetermined value (when brake fluid is not substantially present).

Further, in the above-described embodiment, the seal members 80 and 90 are arranged substantially in symmetrical positions in respect of a straight line connecting substantial centers of the discharge port 61 and the intake port 60, and the balance of pressure in the clearance between the outer rotor 51 and the central plate 73 is maintained. However, for example, both of the seal members may be arranged to shift angles thereof by about several degrees in a direction reverse to rotation of the pump (counterclockwise direction in FIG. 3). In such a case, the pressure in the clearance between the outer rotor 51 and the central plate 73 becomes out of balance, force of pushing the outer rotor to the left lower side of the drawing of FIG. 3 is applied to the outer rotor 51. As a result, the point where the outer rotor 51 is bought into contact with the central plate 73 can further be shifted to the side of the second closed gap portion 53b from the straight line connecting the substantial centers of the discharge port 61 and the intake port 60.

Second Embodiment

A rotary pump according to a second embodiment of the present invention will be described. The rotary pump according to the second embodiment is applicable to a brake apparatus in the similar manner with the rotary pump 10 according to the first embodiment.

Figure 4A:
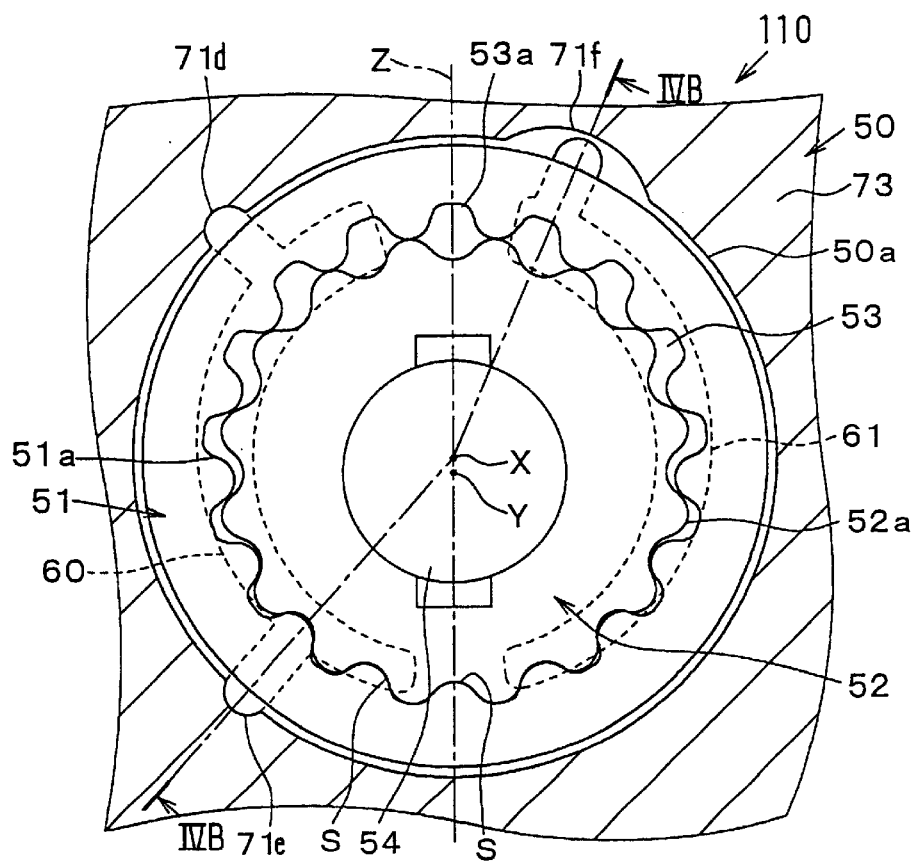
FIG. 4A is a schematic view of a rotary pump according to a second embodiment and FIG. 4B is a sectional view taken from a line IVB—IVB of FIG. 4A.
Figure 4B:
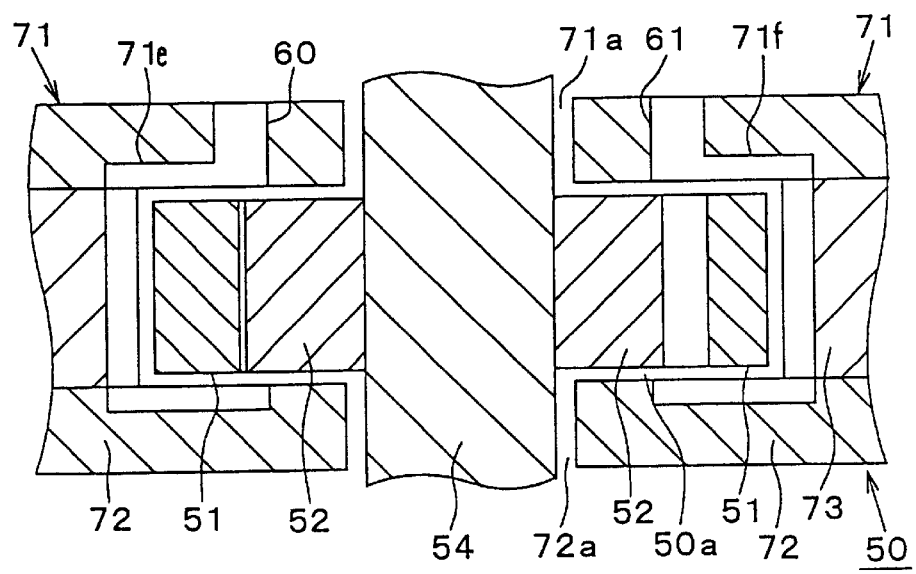

FIG. 4A is a schematic view of a rotary pump 110 and FIG. 4B is a sectional view taken along a line IVB—IVB of FIG. 4A. First, the structure of the rotary pump 110 is described by referring to FIGS. 4A and 4B. It is to be noted that the rotary pump 110 in the second embodiment has a structure similar to that of the rotary pump 10 according to the first embodiment. Therefore, an explanation will be given only of difference of the rotary pump 110 from the rotary pump 10.

In the first side plate 71, communicating paths 71d and 71e for communicating the outer periphery of the outer rotor 51 with the intake port 60 and a communicating path 71f for communicating the outer periphery of the outer rotor 51 with the discharge port 61. The communicating paths 71d and 71e are arranged at positions remote from the center line Z in the direction of the intake port 60 respectively by about 45° around point X corresponding to the rotation axis of the outer rotor 51. As a result, low intake pressure is applied to a portion of the outer periphery of the outer rotor 51 between the communicating path 71d and the communicating path 71e. Further, the communicating path 71f is formed to communicate the gap portion 53 most adjacent to the first closed gap portion 53a among the plurality of gap portions 53 communicating with the discharge port 61 with the outer periphery of the outer rotor 51. That is, the communicating path 71f is arranged at a position remote from the center line Z in the direction to the discharge port 61 by about 30° around point X.

Next, an explanation will be given of the operation of the rotary pump 110 constituted as mentioned above when it is applied to a brake apparatus.

When the master cylinder pressure caused by depressing the brake pedal 1 is applied on the rotary pump 110 via the auxiliary conduit D, in the rotary pump 110, the inner rotor 52 is rotated in accordance with rotation of the drive shaft 54 by driving the motor 11. In accordance with rotation of the inner rotor 52, the outer rotor 51 is also rotated in the same direction by the mesh between the inner teeth portion 51a and the outer teeth portion 52a. In this case, the volume of each of the gap portions 53 is changed from large to small and vice versa during a time period in which the outer rotor 51 and the inner rotor 52 make one turn. The brake fluid is sucked from the intake port 60 and is delivered from the discharge port 61 toward the second conduit A2. The wheel cylinder pressure is increased by the discharged brake fluid.

In operating the pump, particularly when high pressure brake fluid is discharged to the discharge port 61, in the case where the high pressure brake fluid is introduced in the first closed gap portion 53a, an intermediary between the inner teeth portion 51a and the outer teeth portion 52a may be pushed to widen by which a teeth tip clearance may be caused. In that case, leakage of the brake fluid may occur from the teeth tip clearance and high pressure discharge cannot be carried out.

However, according to the rotary pump 110, the communicating paths 71d, 71e and 71f are formed. Accordingly, the outer teeth portion 51a and the inner teeth portion 51b can be prevented from being pushed to widen at the first closed gap portion 53a. An explanation will be given of reason why the outer teeth portion 51a and the inner teeth portion 51b are not pushed to widen by showing a pressure distribution of the brake fluid applied on the outer periphery of the outer rotor 51 in FIG. 5. It is to be noted that, in FIG. 5, the pressure distribution is shown by oblique lines and the length of the oblique line in the diameter direction of the outer rotor 51 represents the magnitude of pressure applied on the outer periphery of the outer rotor 51.

As stated above, since the communicating paths 71d and 71e communicate with the intake port 60, intake pressure, that is, low pressure is applied to the communicating paths 71d and 71e and the portion between the communicating paths 71d and 71e on the outer periphery of the outer rotor 51. To contrary, since the communicating path 71f communicate with the discharge port 61, discharge pressure, that is, high pressure is applied to the communicating path 71f. As a result, the highest pressure is applied on a portion of the outer periphery of the outer rotor 51 corresponding to the communicating path 71f and the lowest pressure is applied to the portion between the communicating paths 71d and 71e on the outer periphery of the outer rotor 51.

Figure 5:
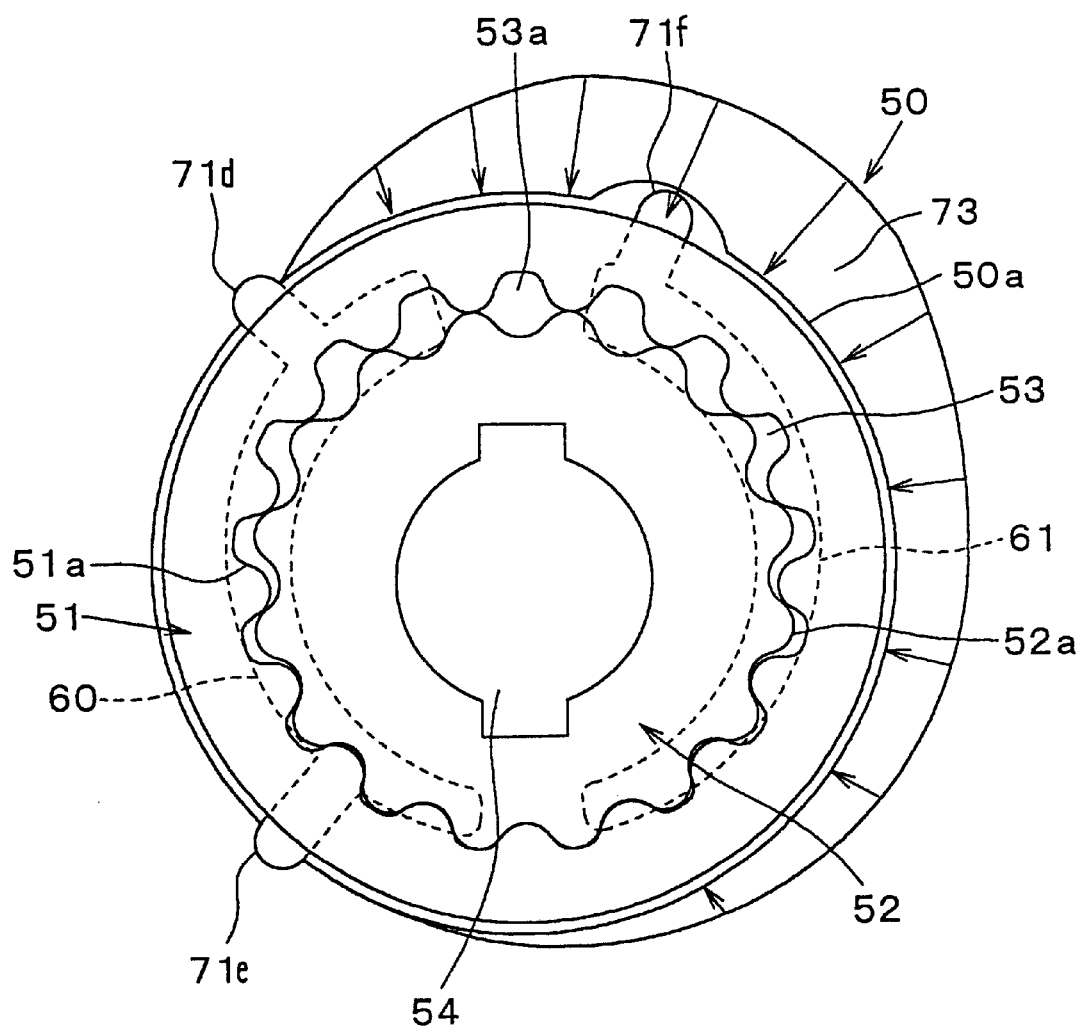
FIG. 5 is a schematic view showing a state of brake fluid pressure applied on an outer periphery of an outer rotor.

Therefore, a pressure distribution having a predetermined pressure gradient from a portion under the highest pressure to a portion under the lowest pressure, that is, a pressure distribution shown is FIG. 5 is formed between the communicating path 71f and the communicating path 71d and between the communicating path 71f and the communicating path 71e. Explaining more in details, because an interval between the communicating path 71f and the communicating path 71d is short, there is formed a pressure gradient in which relatively high pressure is applied over the entire interval of the outer periphery of the outer rotor 51. To contrary, because an interval between the communicating path 71f and the communicating path 71e is long, there is formed a pressure gradient in which relatively low pressure is applied over the entire interval in the outer periphery of the outer rotor 51. Therefore, on the outer periphery of the outer rotor 51, a pressure higher than a pressure applied to a lower side portion of the outer rotor 51 in the drawing is applied to an upper side portion of the outer rotor 51.

As a result, force pressing toward a lower side of the drawing acts on the outer rotor 51. Therefore, at the first closed gap portion 53a, the inner teeth portion 51a of the outer rotor 51 is pushed to the outer teeth portion 52a of the inner rotor 52. The inner teeth portion 51a and the outer teeth portion 52a are prevented from being pushed to widen by pressure difference between intake pressure and discharge pressure. Thereby, leakage of the brake fluid by the teeth tip clearance can be prevented.

A discussion will be given of pressure balance in the rotary pump 110. The gap portions 53 communicating with the intake port 60 are under low intake pressure and a short portion of the outer periphery of the outer rotor 51 between the communicating path 71d and the communicating path 71e is also under low intake pressure. Accordingly, the portion of the outer rotor 51 corresponding to the short portion is balanced in pressure by receiving an equivalent pressure on its inner periphery and its outer periphery. Meanwhile, the gap portions 53 communicating with the discharge port 61 are under high discharge pressure and a long portion of the outer periphery of the outer rotor 51 between the communicating path 71f and the communicating path 71d and between the communicating path 71f and the communicating path 71e is under high pressure having the above-mentioned predetermined gradient. Therefore, the portion of the outer rotor 51 corresponding to the discharge port 61 is roughly balanced in pressure by receiving the high pressure on its inner periphery and its outer periphery. At the portion of the outer rotor 51 from the first closed gap portion 53a to the communicating path 71d, the high pressure is applied to the outer periphery of the outer rotor 51 and the low pressure is applied to the inner periphery thereof. Therefore, the force toward the lower side of the drawing acts on the outer rotor 51.

Accordingly, the pump can be driven smoothly by generally balancing pressures on the inner and outer peripheries of the outer rotor 51 while the inner teeth portion 51a and the outer teeth portion 52a are prevented from being pushed to widen at the first closed gap portion 53a.

In this way, since pressures of the inner and outer peripheries of the outer rotor 51 are balanced while brake fluid is prevented from leaking at the teeth tip clearance, the pump efficiency can be promoted.

Therefore, by applying the rotary pump 110 to a brake apparatus which needs to carry out a high pressure discharge operation, leakage of the brake fluid from the teeth tip clearance can be prevented and accordingly, the braking operation can excellently be carried out.

As mentioned above, the force toward the lower side of the drawing acts on the outer rotor 51. However, the pressure difference between a pressure applied on the upper side portion of the outer periphery of the outer rotor 51 and a pressure applied on the lower side portion thereof in the drawing is not so large that the outer rotor 51 is strongly pushed to the central plate 73. Accordingly, the durability of the rotary pump 110 is not deteriorated by the force applied on the outer rotor 51.

According to the second embodiment, by forming the communicating paths 71d, 71e and 71f at the predetermined positions, the outer teeth portion 51a and the inner teeth portion 52a are prevented from being pushed to widen at the first closed gap portion 53a. However, the positions of the communicating paths 71d, 71e and 71f are not limited to the positions shown by the second embodiment but may be any positions so far as the force is applied on the outer rotor 51 in a direction where the inner teeth portion 51a of the outer rotor 51 is pushed to the outer teeth portion 52a of the inner rotor 52 at the first closed gap portion 53a.

Further, although as shown in FIG. 4A, the communicating paths 71d, 71e and 71f are formed substantially with the same width, shapes of the communicating paths 71d, 71e and 71f are not limited to that in the above-described embodiment. For example, the communicating paths 71d, 71e and 71f may be formed in a shape having a wide width at the outer periphery of the outer rotor 51.

According to the second embodiment, the communicating paths 71d and 71e communicate the outer periphery of the outer rotor 51 with the intake port 60. The outer periphery of the outer rotor 51 between the communicating paths 71d and 71e is under low intake pressure by the communicating paths 71d and 71e. However, similar effect can be achieved even when the communicating paths 71d and 71e communicate a portion having low pressure similar to pressure at the intake port 60, for example, a low pressure reservoir or the like with the outer periphery of the outer rotor 51. Further, the communicating path 71f communicates the outer periphery of the outer rotor 51 with the discharge port 61. The outer periphery of the outer rotor 51 between the communicating paths 71f and 71d and between the communicating paths 71f and 71e is under high delivery pressure by the communicating path 71f. Accordingly, similar effect can be achieved even when the communicating path 71f communicates a portion having high pressure similar to pressure at the discharge port 61 with the outer periphery of the outer rotor 51.

Third Embodiment

A rotary pump 210 according to a third embodiment of the present invention will be described. The rotary pump 210 according to the third embodiment is also applicable to a brake apparatus in the similar manner with the rotary pump 10 according to the first embodiment.

The rotary pump 210 according to the third embodiment also has a structure similar to that of the rotary pump 10 of the first embodiment. An explanation will be only given of difference of the rotary pump 210 from the rotary pump 10.

Figure 6A:
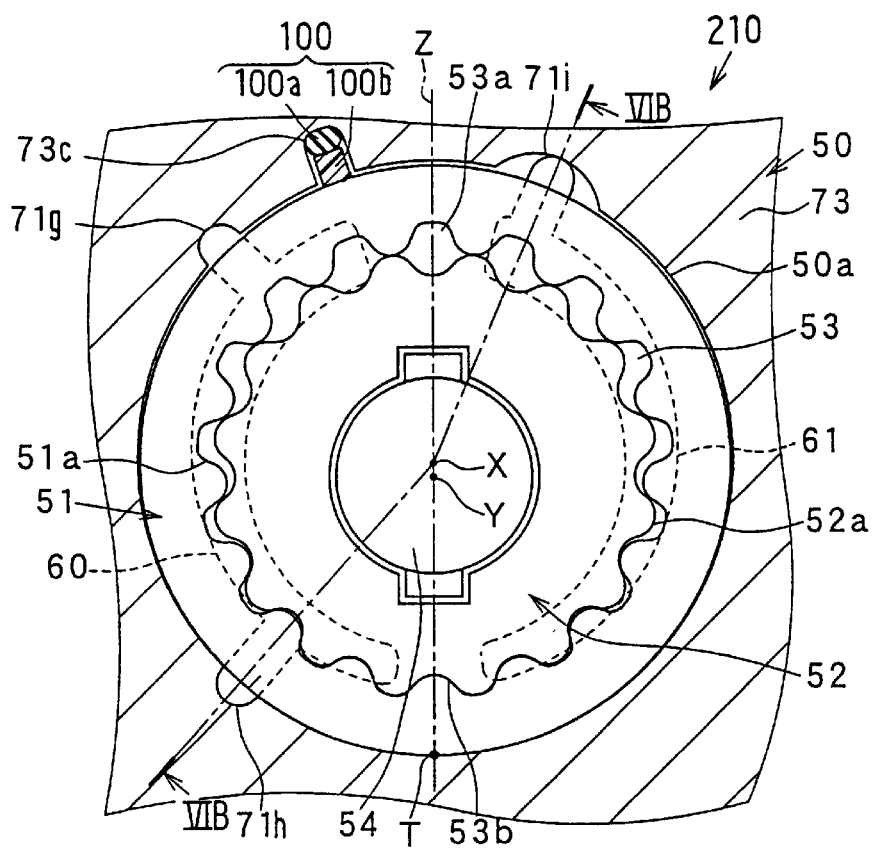
FIG. 6A is a schematic view of a rotary pump according to a third embodiment and FIG. 6B is a sectional view taken along a line VIB—VIB of FIG. 6A.
Figure 6B:
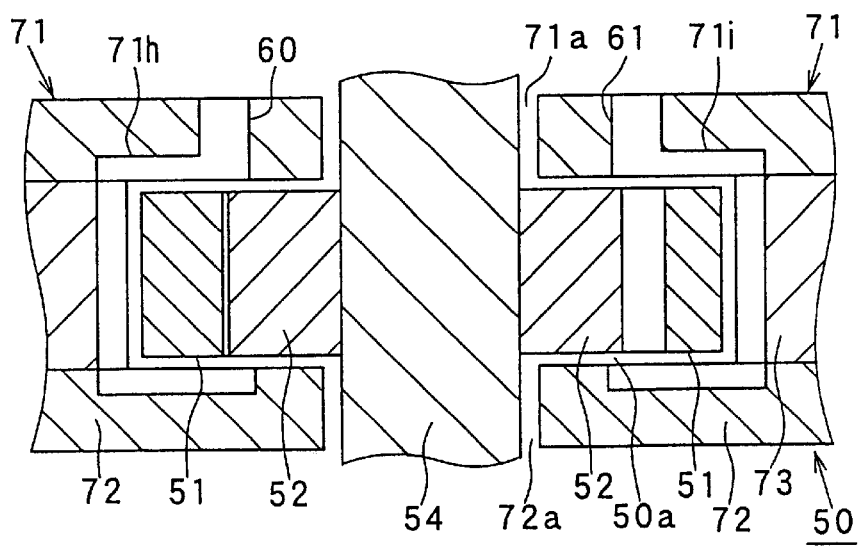

In FIGS. 6A and 6B, communicating paths 71g and 71h communicating the outer periphery of the outer rotor 51 with the intake port 60 and a communicating path 71i communicating the outer periphery of the outer rotor 51 with the discharge port 61 are formed in the first side plate 71. The communicating paths 71g and 71h are arranged at positions remote from the center line Z in the direction to the intake port 60 respectively by about 45° around point X corresponding to the rotation axis of the outer rotor 51. The communicating path 71i is formed to communicate the gap portion 53 most adjacent to the first closed gap portion 53a among the plurality of gap portions 53 communicating with the discharge port 61 with the outer periphery of the outer rotor 51. That is, the communicating path 71i is arranged at a position remote from the center line Z in the direction to the discharge port 61 by about 22.5° around point X.

A recessed portion 73c is formed on the wall face of the central plate 73 forming the rotor chamber 50a at a position remote from the center line Z in the direction to the intake port 60 by about 22.5° around point X. A seal member 100 for restraining flow of the brake fluid on the outer periphery of the outer rotor 51 is provided in the recessed portion 73c. Specifically, the seal member 100 is arranged between the communicating path 71g and the communicating path 71i for separating a portion where pressure of the brake fluid is low from a portion where it is high.

Figure 7:
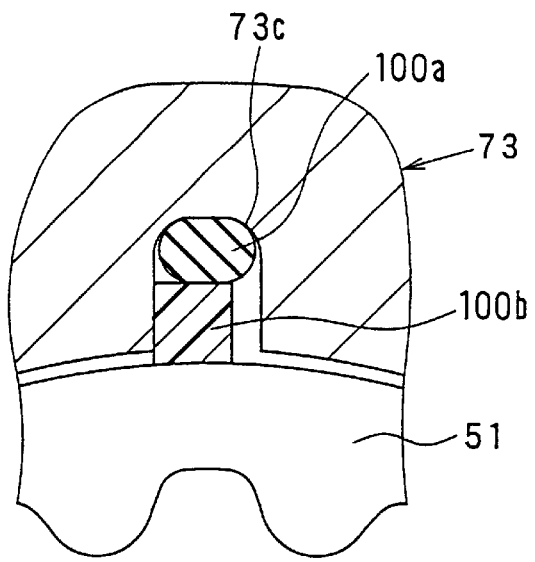
FIG. 7 is a partially enlarged view showing a vicinity of a seal member.

FIG. 7 is a partially enlarged view of a vicinity of the seal member 100. The seal member 100 is constituted by a rubber member 100a substantially in a shape of a circular cylinder and a resin member 100b made of Teflon in a shape of a cube. Further, the resin member 100b is brought into contact with the outer rotor 51 since it is pushed by the rubber member 100a. That is, more or less error in size of the outer rotor 51 occurs due to fabrication error or the like. Accordingly, the error can be absorbed by the rubber member 100a having elastic force.

The width of the resin member 100b is set so that a clearance is produced to some degree in the recessed portion 73c when the resin member 100b is arranged in the recessed portion 73c. That is, when the width of the resin member 100b is formed equivalently with the width of the recessed portion 73c, if the resin member 100b enters the recessed portion 73c by a variation in pressure of the brake fluid, the resin member 100b is difficult to come out therefrom. Accordingly, by forming the resin member 100b in a size to a degree of producing more or less clearance in the recessed portion 73c, the brake fluid enters an upper portion of the recessed portion 73c. Therefore, the resin member 100b is easy to come out from the recessed portion 73c by the pressure of the brake fluid entering it.

Next, an explanation will be given of the operation of the rotary pump 210 constituted as described above when it is applied to a brake apparatus.

The master cylinder pressure produced by depressing the brake pedal 1 is applied to the rotary pump 210 via the auxiliary conduit D. In the rotary pump 210, the inner rotor 52 is rotated in accordance with rotation of the drive shaft 54 by driving the motor 11. In accordance with rotation of the inner rotor 52, the outer rotor 51 is also rotated in the same direction by the mesh between the inner teeth portion 51a and the outer teeth portion 52a. In this case, the volume of each of the gap portions 53 is changed from large to small and vice versa during a time period in which the outer rotor 51 and the inner rotor 52 make one turn. Accordingly, the brake fluid is sucked from the intake port 60 and is discharged from the discharge port 61 toward the second conduit A2. The wheel cylinder pressure is increased using the discharged brake fluid.

During the operation of the pump, the outer periphery of the outer rotor 51 on the side of the intake port 60 is under intake pressure (low pressure) by the brake fluid introduced thereinto via the communicating paths 71g and 71h. Meanwhile, the outer periphery of the outer rotor 51 on the side of the discharge port 61 is under discharge pressure (high pressure) by the brake fluid introduced thereinto via the communicating path 71i. Therefore, a portion under low pressure and a portion under high pressure are produced on the outer periphery of the outer rotor 51.

However, as mentioned above, the portion under low pressure and the portion under high pressure on the outer periphery of the outer rotor 51 are separated by the seal member 100 formed between the communicating paths 71g and 71i. Accordingly, oil leakage is not caused from the high pressure portion on the side of the discharge port 61 to the low pressure portion on the side of the intake port 60 via the outer periphery of the outer rotor 51. Therefore, the pressure at the outer periphery of the outer rotor 51 on the side of the intake port 60 is maintained to the low pressure which is similar to pressure at the gap portions 53 communicating with the intake port 60. Further, the pressure at the outer periphery of the outer rotor 51 on the side of the discharge port 61 is maintained to the high pressure which is similar to pressure in the gap portions 53 communicating with the discharge port 61. As a result, pressure balance between the inner and outer peripheries of the outer rotor 51 is maintained and the pump can be driven stably.

Meanwhile, on the outer periphery of the outer rotor 51, other than an intermediary between the communicating path 71$i$ and the communicating path 71$g$, even at an intermediary between the communicating path 71$i$ and the communicating path 71$h$, a portion where pressure of the brake fluid is changed from high to low is produced. However, according to the third embodiment, a seal member is not arranged at that portion by the following reason.

According to the rotary pump 210 of the third embodiment, an intermediary between the inner teeth portion 51$a$ and the outer teeth portion 52$a$ is prevented from being pushed to widen at the first closed gap portion 53$a$. As a result, the high pressure brake fluid in the gap portions 53 communicating with the discharge port 61 is prevented from leaking to the gap portions 53 communicating with the intake port 60. During an operation of the pump 210, particularly when the high pressure brake fluid is discharged to the discharge port 61, if the high pressure brake fluid is confined in the gap portions 53, the intermediary between the inner teeth portion 51$a$ and the outer teeth portion 52$a$ may be widened. Therefore, it is necessary to prevent this.

To present this, according to the rotary pump 210 of the embodiment, the outer rotor 51 is moved to a lower side of the drawing by force due to the high pressure brake fluid applied to a portion of the outer periphery of the outer rotor 51, whereby the inner teeth portion 51$a$ is pushed to the outer teeth portion 52$a$ at the first closed gap portion 53$a$. Therefore, the outer periphery of the outer rotor 51 is brought into contact with the central plate 73$a$ at a point between the communicating path 71$i$ and the communicating path 71$h$. The contact point plays a role of a restrictor. Flow of the brake fluid via the outer periphery of the outer rotor 51 is restrained by the contact point. Therefore, pressure balance between the inner and outer peripheries of the outer rotor 51 can be maintained without installing a seal member between the communicating paths 71$h$ and 71$i$.

An explanation will be given of a method of moving the outer rotor 51 to the lower side of the drawing as mentioned above.

Figure 8:
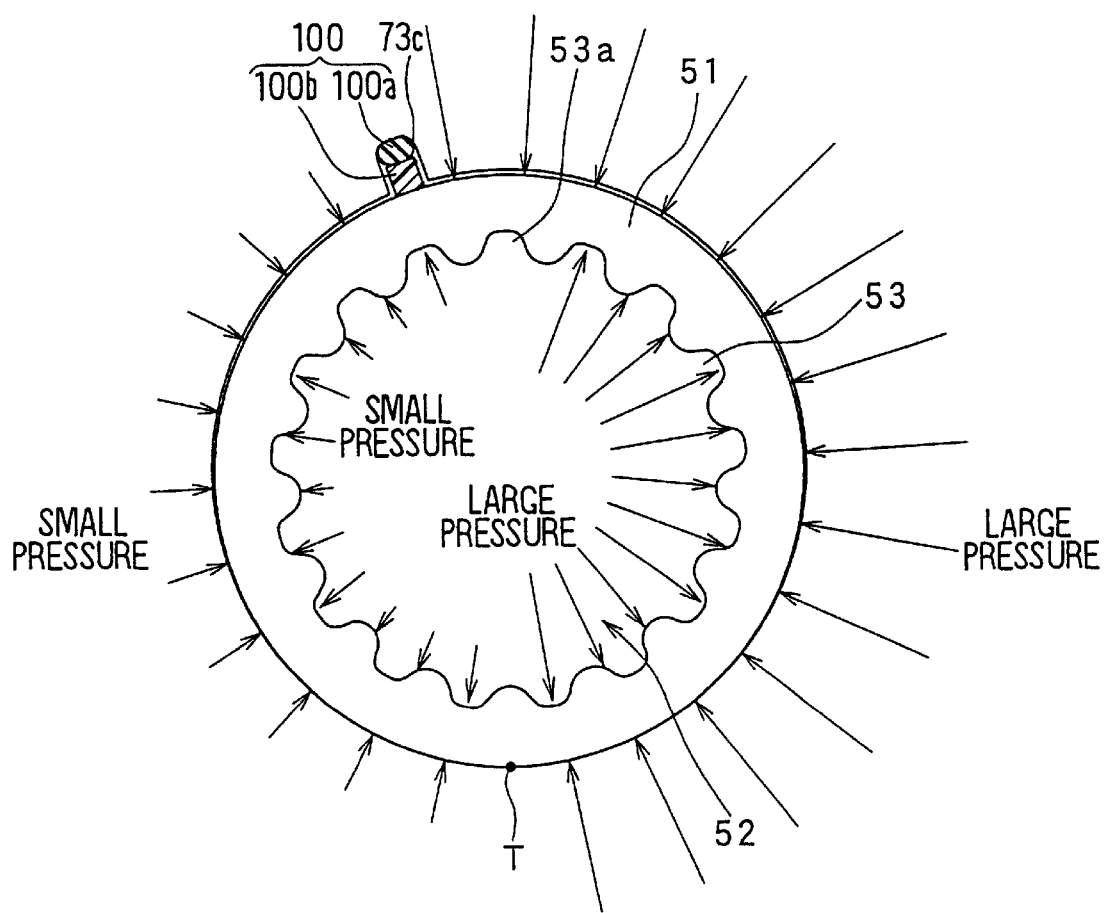
FIG. 8 is an explanatory view showing a relationship of pressure at the inside and the outside of an outer rotor.

A pressure distribution of the brake fluid applied to the inner and outer peripheries of the outer rotor 51 is shown in FIG. 8. It is to be noted that the pressure distribution is indicated by arrow marks in FIG. 8 and length of the arrow mark represents the magnitude of pressure applied to the outer rotor 51.

As mentioned above, the outer rotor 51 and the central plate 73 share the contact point. When the contact point is designated by point T in FIG. 8, the outer periphery of the outer rotor 51 interposed between the seal member 100 and the point T on the side of the intake port 60 receives low pressure. The outer periphery of the outer rotor 51 on the side of the discharge port 61 receives high pressure. At the inside of the outer rotor 51, low pressure brake fluid is introduced in the gap portions 53 communicating with the intake port 60 and high pressure brake fluid is discharged from the gap portions 53 communicating with the discharge port 61. Therefore, pressures of the brake fluid at the inner and outer peripheries of the outer rotor 51 are roughly balanced.

However, the seal member 100 is arranged at the position shifted from the center line Z to the side of the intake port 60 by the predetermined angle. Accordingly, a portion of the outer periphery of the outer rotor 51 at an upper side of the drawing receives high pressure. To contrary, a portion of the inner periphery of the outer rotor 51 at the upper side of the drawing is applied with low pressure (intake pressure) lower than that applied to the portion of the outer periphery of the outer rotor 51. Therefore, pressures are not balanced at the upper side portion of the outer rotor 51 in the drawing. Accordingly, force toward the lower side of the drawing acts on the outer rotor 51, whereby the outer rotor 51 moves to the lower side of the drawing.

When the outer rotor 51 moves to the lower side of the drawing so that the inner teeth portion 51$a$ is pushed to the outer teeth portion 52$a$ at the first closed gap portion 53$a$, because the seal member 100 is installed between the communicating paths 71$g$ and 71$i$ on the outer periphery of the outer rotor 51, the brake fluid can be prevented from leaking from the portion under high pressure to the portion under low pressure on the outer periphery of the outer rotor 51. Thereby, the volumetric efficiency of the pump can be promoted and at the same time, the pump can be driven stably.

Although the force toward the lower side of the drawing acts on the outer rotor 51, a pressure difference between the pressure applied on the upper side portion of the outer periphery of the outer rotor 51 and the pressure applied on the upper side portion of the inner periphery of the outer rotor 52, is not so large that the outer rotor 51 is strongly pushed to the central plate 73. Therefore, the durability of the rotary pump 210 is not deteriorated by the force applied to the outer rotor 51.

Although the third embodiment shows an example in which the outer rotor 51 is moved so that the inner teeth portion 51$a$ is pushed to the outer teeth portion 52$a$ at the first closed gap portion 53$a$ by shifting the seal member 100 from the center line Z to the side of the intake port 60 by the predetermined angle. However, this is only one example and the direction of moving the outer rotor 51 can pertinently be set in accordance with the necessity.

Fourth Embodiment

Figure 9:
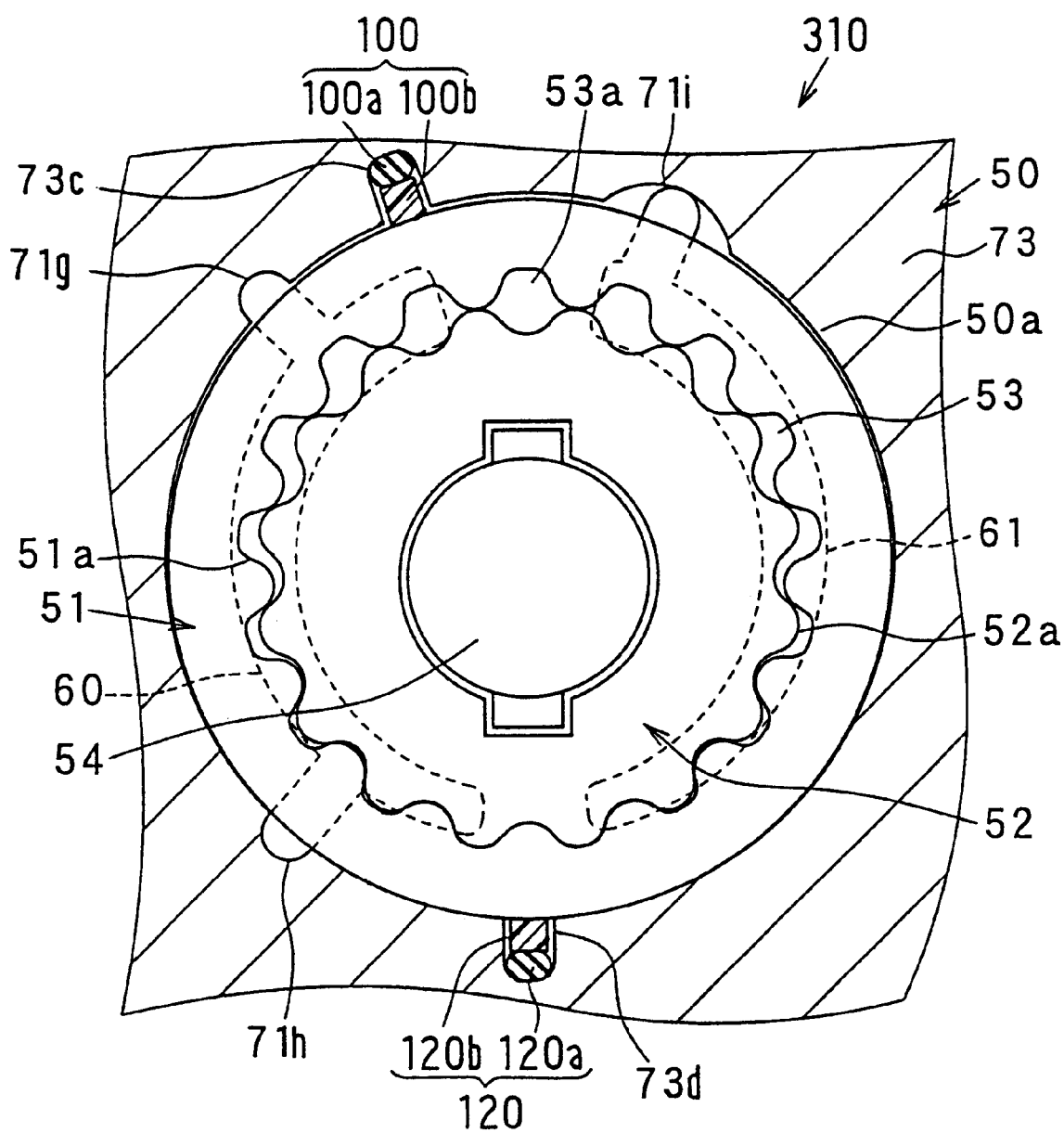
FIG. 9 is a schematic view of a rotary pump according to a fourth embodiment.

FIG. 9 is a schematic view of a rotary pump 310 according to the third embodiment. The rotary pump 310 according to the third embodiment has a structure substantially similar to that shown by the first embodiment. Accordingly, an explanation will be only given of a portion thereof different from the first embodiment.

As shown in FIG. 9, according to the rotary pump 310 of the third embodiment, a recessed portion 73$d$ is formed on the wall face of the central plate 73 between the communicating paths 71$h$ and 71$i$ on the outer periphery of the outer rotor 51. A seal member 120 is arranged in the recessed portion 73$d$. Specifically, the recessed portion 73$d$ is arranged at a position intersecting with the center line Z between the communicating paths 71$h$ and 71$i$. The seal member 120 is constituted by a rubber member 120$a$ and a resin member 120$b$ similar to the seal member 100.

Also in this embodiment, the seal member 110 is arranged in the same position as the seal member 100 of the third embodiment. As a result, imbalance of pressure occurs between the inner and outer peripheries of the outer rotor at its upper side, whereby the outer rotor 51 is moved to the lower side of the drawing so that the inner teeth portion 51$a$ is pushed to the outer teeth portion 52$a$ in the first closed gap portion 53$a$. Therefore, leakage of the brake fluid between the communicating path 71$h$ and 71$i$ can be prevented even without installing the seal member 120. However, when the sealing performance between the communicating paths 71*h* and 71*i* is ensured by the contact point between the outer rotor 51 and the casing 50 (point T in the drawing), the sealing performance is not always sufficient.

Therefore, by installing the sealing member 120 between the communicating paths 71*h* and 71*i*, the sealing performance therebetween can effectively be achieved.

Further, when the seal member 120 is installed between the communicating paths 71*h* and 71*i*, the sealing performance therebetween can be ensured even in a rotary pump in which the outer rotor 51 is not moved to the lower side of the drawing in such a manner that the inner teeth portion 51*a* pushes the outer teeth portion 52*a* at the first closed gap portion 53*a*.

Fifth Embodiment

Figure 10:
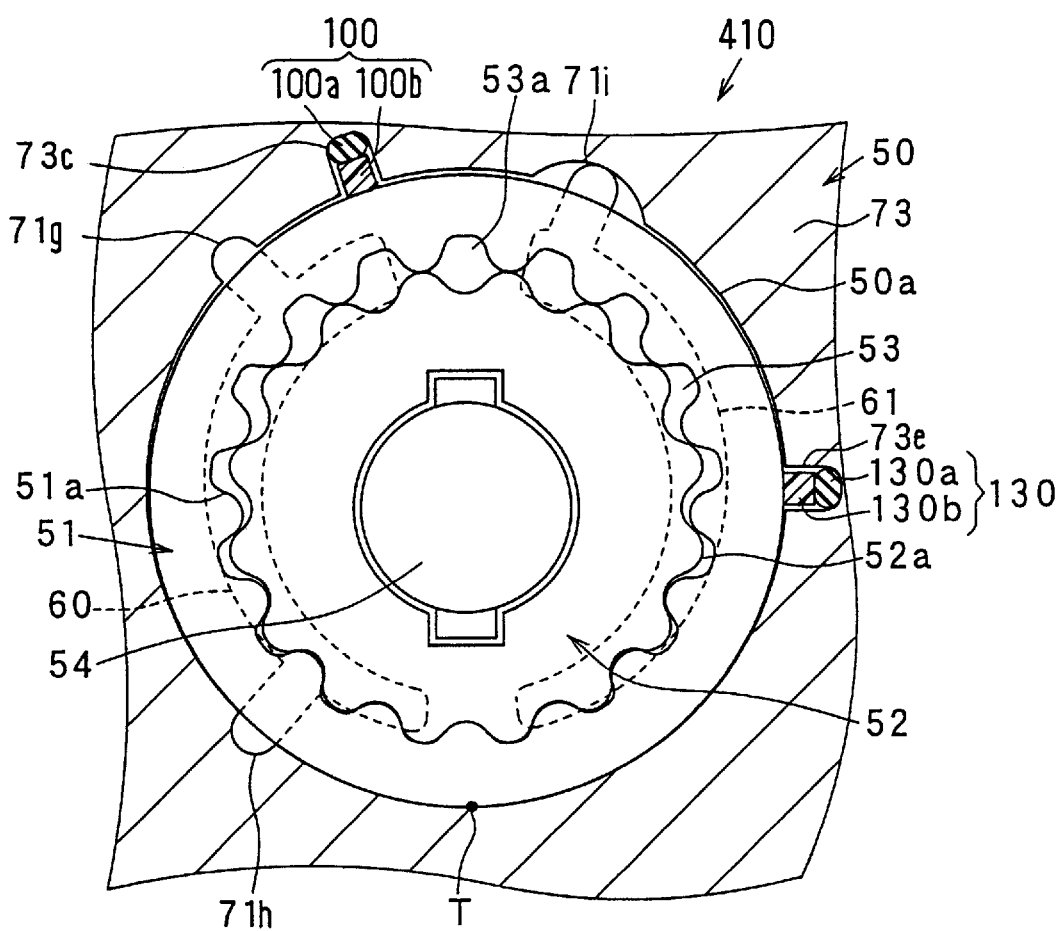
FIG. 10 is a schematic view of a rotary pump according to a fifth embodiment.

FIG. 10 shows a schematic view of a rotary pump 410 according to the fifth embodiment. The rotary pump 410 has a structure substantially similar to that shown by the first embodiment. Accordingly, an explanation will be given only of a portion thereof different from the first embodiment.

As shown in FIG. 10, in the rotary pump 410, a recessed portion 73*e* is formed on the wall face of the central plate 73 between the communicating paths 71*h* and 71*i* on the outer periphery of the outer rotor 51 and at a middle position of the discharge port 61 extending in the peripheral direction of the outer rotor 51. A seal member 130 is arranged in the recessed portion 73*e*. Specifically, the recessed portion 73*e* is arranged at a position shifted from the center line Z in the direction to the discharge port 61 by about 90° around point X corresponding to the rotation axis of the outer rotor 51. Further, the seal member 130 is constituted by a rubber member 130*a* and a resin member 130*b* similar to the seal member 100.

The brake fluid present on the outer periphery of the outer rotor 51 has a property in which it flows in a rotational direction in accordance with rotation of the outer rotor 51. However, when the seal member 130 is arranged at the middle position of the discharge port 61 on the outer periphery of the outer rotor 51, the flow of the brake fluid is restrained by the seal member 130. Therefore, the brake fluid cannot flow so much from the upperstream side of the seal member 130 to the downstream side of thereof on the outer periphery of the outer rotor 61. Although the downstream side of the seal member 130 on the outer periphery of the outer rotor 61 is under high pressure by more or less leakage of the brake fluid through the seal member 130, pressure on the upperstream side of the seal member 130 becomes higher than pressure on the downstream side of the seal member 130 by an amount of flow of the brake fluid restrained by the seal member 130.

The first closed gap portion 53*a* is present on the upperstream side of the seal member 130. Therefore, the outer rotor 51 can be moved to the lower side of the drawing more effectively by the high pressure applied to the outer periphery of the outer rotor 51. That is, the force of moving the outer rotor 51 to the lower side of the drawing can be made stronger than that of the fourth embodiment. Accordingly, the intermediary between the inner teeth portion 51*a* and the outer teeth portion 52*a* can effectively be prevented from widening at the first closed gap portion 53*a*. Further, the force for bringing the outer rotor 51 in contact with the casing 50 at the contact point (point T in the drawing) is intensified and the sealing performance at the contact point can more excellently be ensured.

Sixth Embodiment

Figure 11:
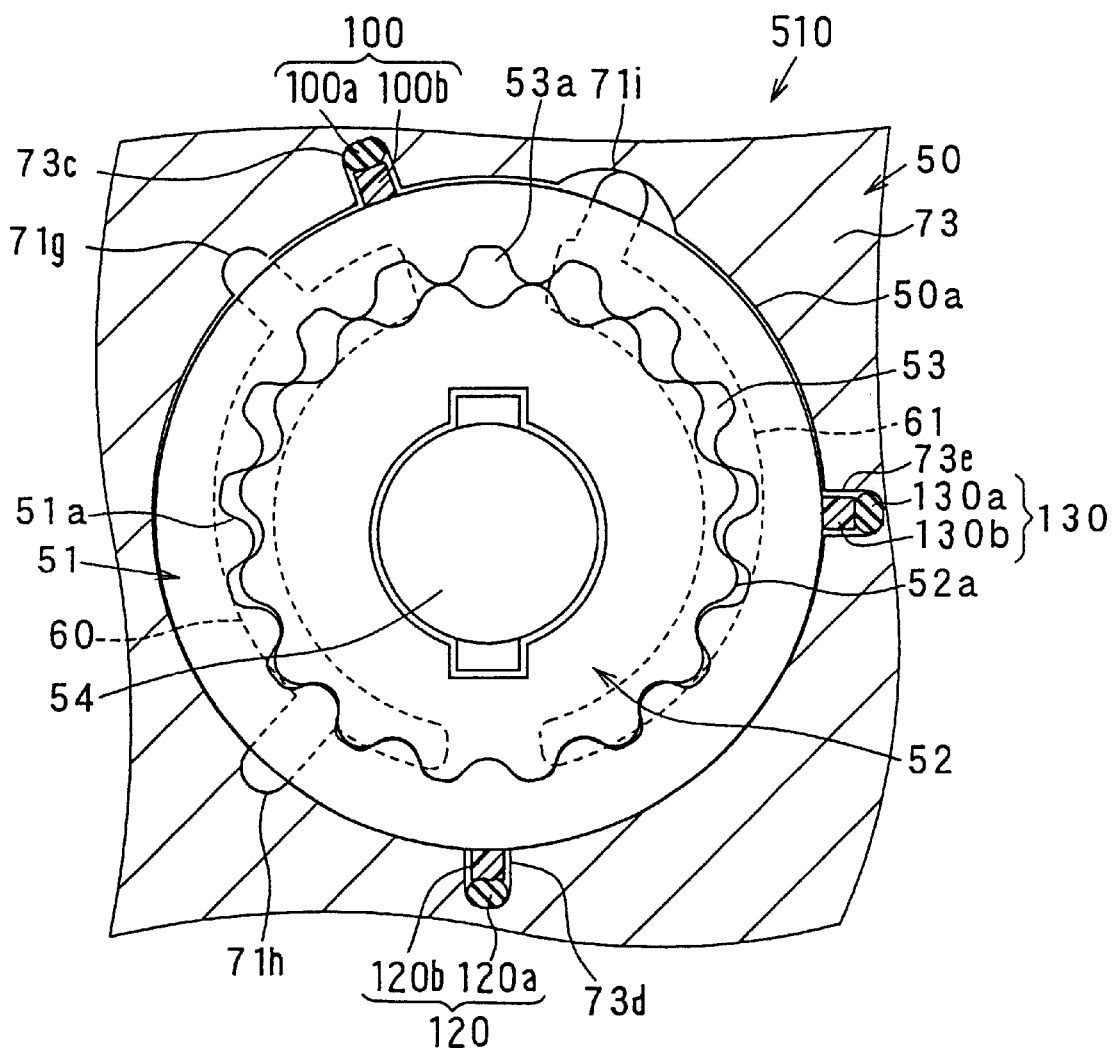
FIG. 11 is a schematic view of a rotary pump according to a sixth embodiment.

FIG. 11 shows a schematic view of a rotary pump 510 according to the Sixth embodiment. In the rotary pump 510, both of the seal member 120 of the fourth embodiment and the seal member 130 of the fifth embodiment are employed.

By arranging the seal member 120 and the seal member 130 in the rotary pump 510, both of effects according to the fourth embodiment and the fifth embodiment can be achieved in the rotary pump 510.

Seventh Embodiment

Figure 12A:
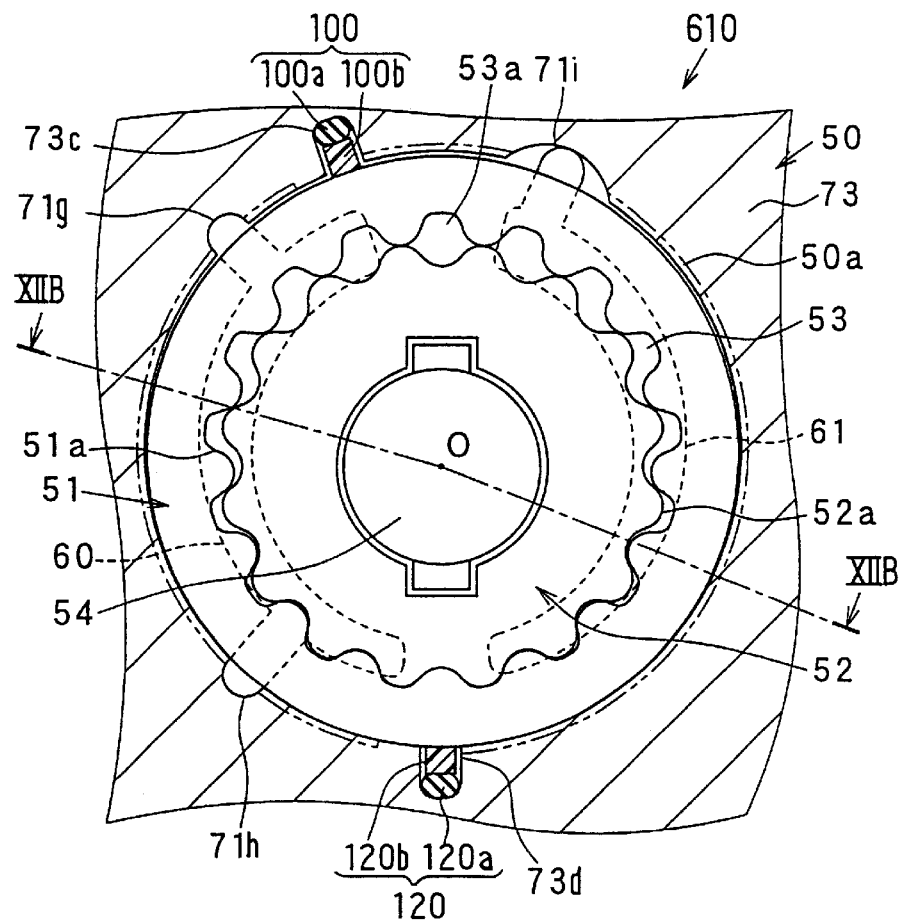
FIGS. 12A and 12B are schematic views of a rotary pump according to a seventh embodiment.
Figure 12B:
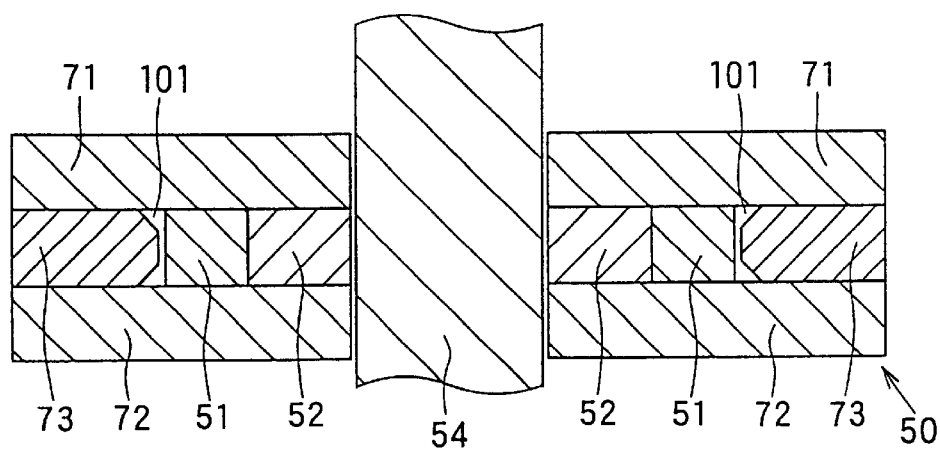

FIGS. 12A and 12B are schematic views of a rotary pump 610 according to the seventh embodiment. FIG. 12A is a schematic view of the rotary pump 610 as viewed from a direction of the drive shaft 54 and FIG. 12B is a sectional view taken from a line XIIB—XIIB of FIG. 12A.

As shown in FIG. 12B, corner portions of the hole of the central plate 73 are chamfered by cutting them. As shown by a two-dotted chain line in FIG. 12A, the corner portions of the hole of the central plate 73 are chamfered substantially over the entire inner periphery of the hole. Portions of the inner periphery at vicinities of the recessed portions 73*c* and 73*d* arranged with the seal members 100 and 120 on the side of the intake port 60, are not chamfered.

Communicating paths 101 are formed between the outer periphery of the outer rotor 51 and the central plate 73 by the corner portions of the hole of the central plate 73 which are chamfered. As a result, pressure of the brake fluid on the outer periphery of the outer rotor 51 is made uniform through the communicating paths 101.

That is, when the pump is driven, the brake fluid present at a vicinity of the outer periphery of the outer rotor 51 is dragged in accordance with rotation of the outer rotor 51 and on a dragged side, pressure of the brake fluid may be increased. As a result, pressure on the outer periphery of the outer rotor 51 may not be uniform both on the side of the intake port 60 and on the side of the discharge port 61 between the seal member 100 and the seal member 120. In such a case, there is a possibility in which high performance of a pump is not obtained stably.

However, in the seventh embodiment, the corner portions of the hole of the central plate 73 are chamfered and accordingly, the pressure on the outer periphery of the outer rotor 51 is made uniform. As a result, high performance of the pump can stably be obtained.

The corner portions of the hole of the central plate 73 are not chamfered at vicinities of the recessed portion 73*a* on the side of the intake port 60. This is because the portions may be brought into contact with the seal members 100 and 120. Assuming that the chamfering is carried out also at these portions, there is a possibility in which the seal members 100 and 120 enter the communicating paths 101 when the seal members 100 and 120 are deformed by the high pressure brake fluid. However, this can be prevented by dispensing with the chamfering.

Figure 13:
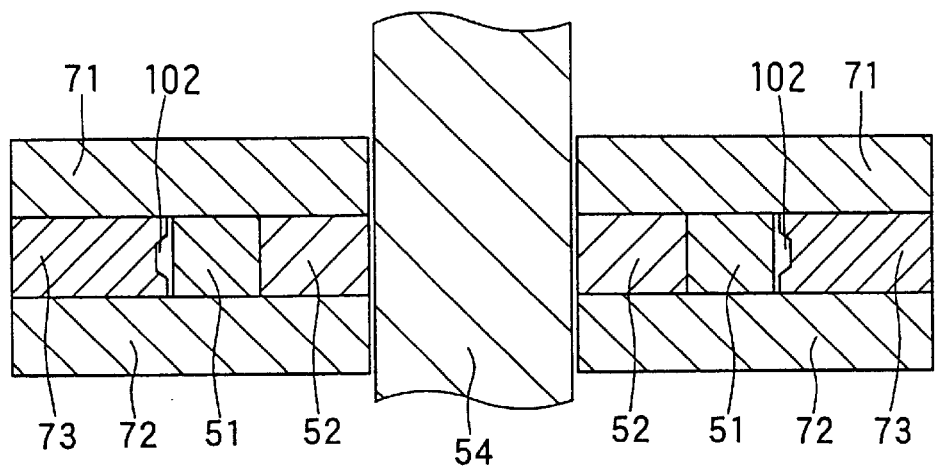
FIG. 13 is a view for explaining a modification of the rotary pump according to the seventh embodiment.

Although as shown in FIG. 12B, the communicating paths 101 are formed by chamfering the corner portions of the hole of the central plate 73 in the above-mentioned embodiment, the communicating path can be formed by forming a groove 102 on the inner periphery of the hole of the central plate 73 as shown in FIG. 13.

Other Embodiments

Although in the embodiments mentioned above, for example, a combination of two members of the rubber member 80*a* and the resin member 80*b* is used as the seal member 80, other member may be used as the seal member 80.

Figure 14:
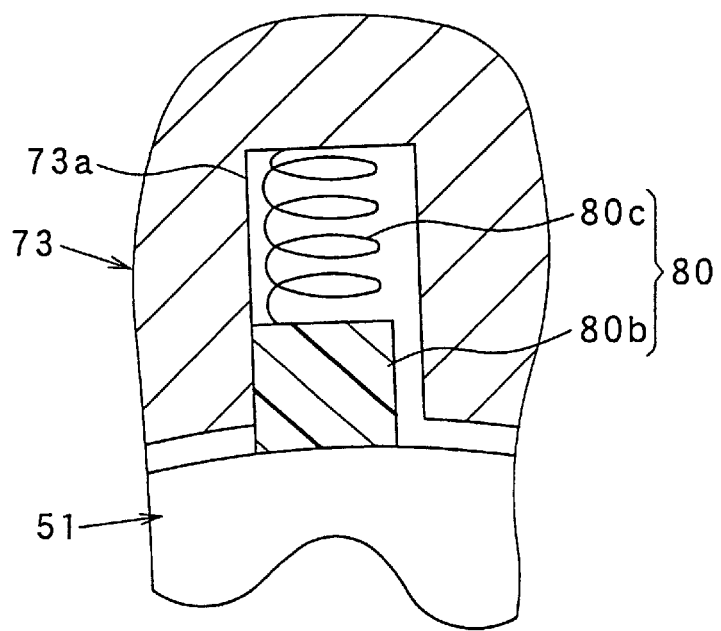

For example, when the seal member 80 is constituted by two members, as shown by FIG. 14, the seal member 80 may be constituted by a spring 80c and the resin member 80b. In this case, the resin member 80b may be pushed to the outer rotor 51 by elastic force of the spring 80c.

Figure 15:
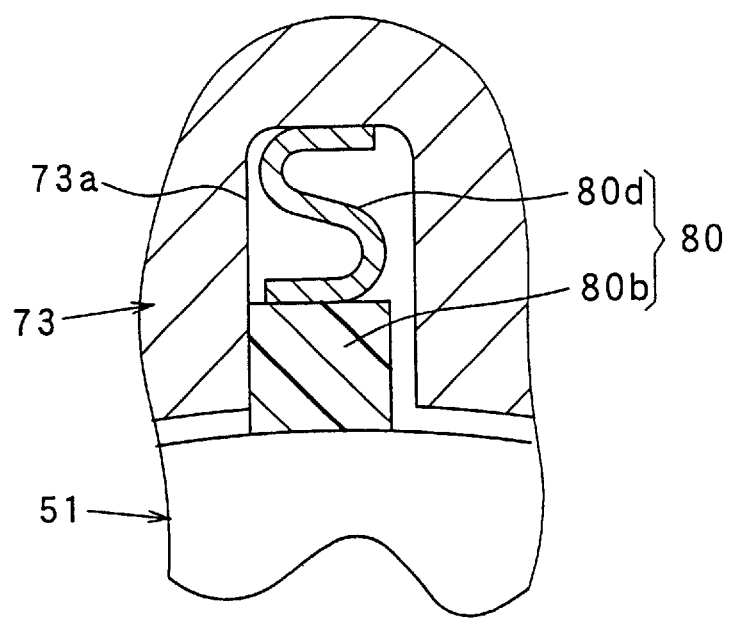

Further, as shown by FIG. 15, the seal member 80 may be constituted by a leaf spring 80d and the resin member 80b. In this case also, the resin member 80b may be pushed to the outer rotor 51 by elastic force of the leaf spring 80d.

Figure 16:
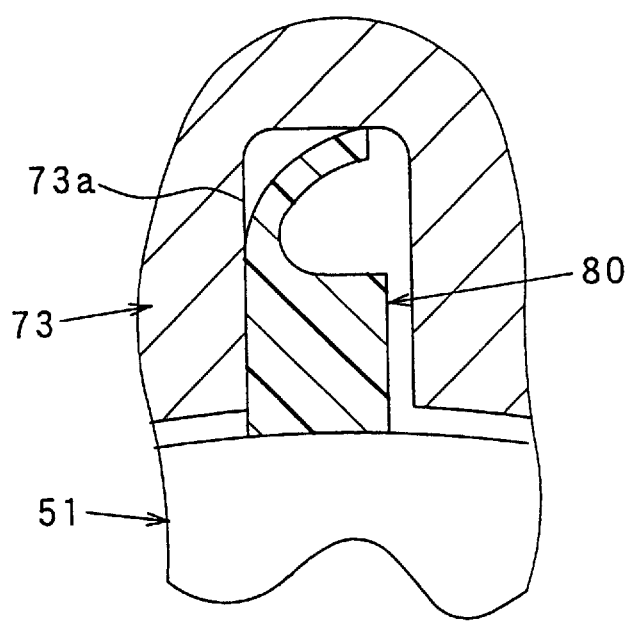

Further, when the seal member 80 is constituted by one member, as shown by FIG. 16, a member integrally formed with a seal portion formed substantially in a shape of a cube and an elastic portion formed in a thin wall may be used. In this case, as material of the seal member 80, resin, metal, rubber or the like can be used.

Figure 17:
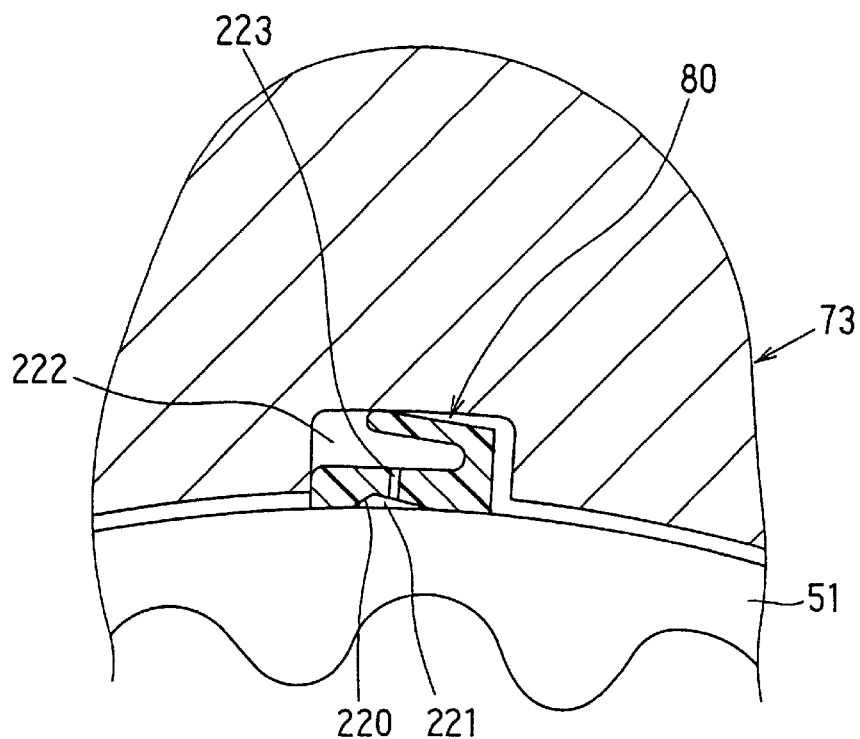

Further, when the seal member 80 is constituted by a member integrally formed with a seal portion and an elastic portion, as shown by FIG. 17, a groove portion 220 may be provided at the bottom of the seal portion to reduce sliding resistance between the seal portion and the outer rotor 51. In such a case, the seal member 80 may be deformed by differential pressure caused between a space 221 produced between the seal member 80 and the outer rotor 51 at the groove portion 220 and a space 222 produced between the seal member 80 and the central plate 73. Therefore, by forming a communicating path 223 communicating the spaces 221 and 222 with each other in the seal member 80, the differential pressure between the space 221 and the space 222 can be eliminated and the deformation of the seal member 80 caused by the differential pressure can be prevented.

Figure 18:
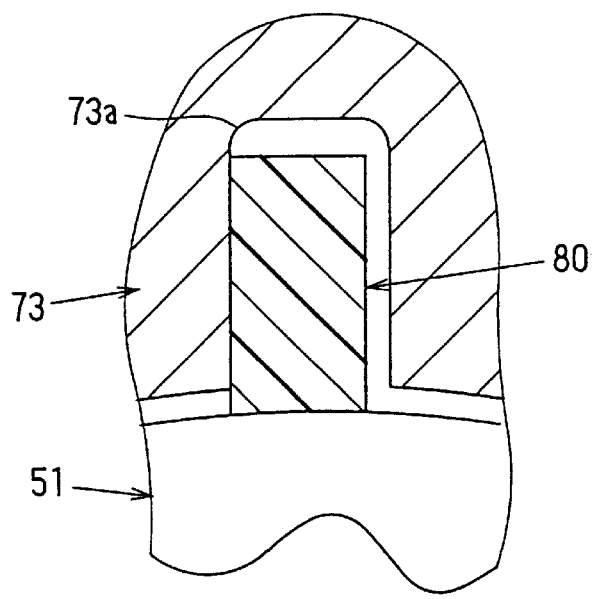

Further, as shown by FIG. 18, the seal member 80 can simply be formed substantially in a shape of a cube. In this case, the size of the seal member 80 needs to determine in consideration of the depth of the recessed portion. That is, a space may be produced between the bottom of the recessed portion and the seal member 80 to a degree capable of absorbing error amount of the outer rotor 51. In this case, the force of pushing the seal member 80 to the outer rotor 51 is produced by hydraulic pressure.

Figure 19:
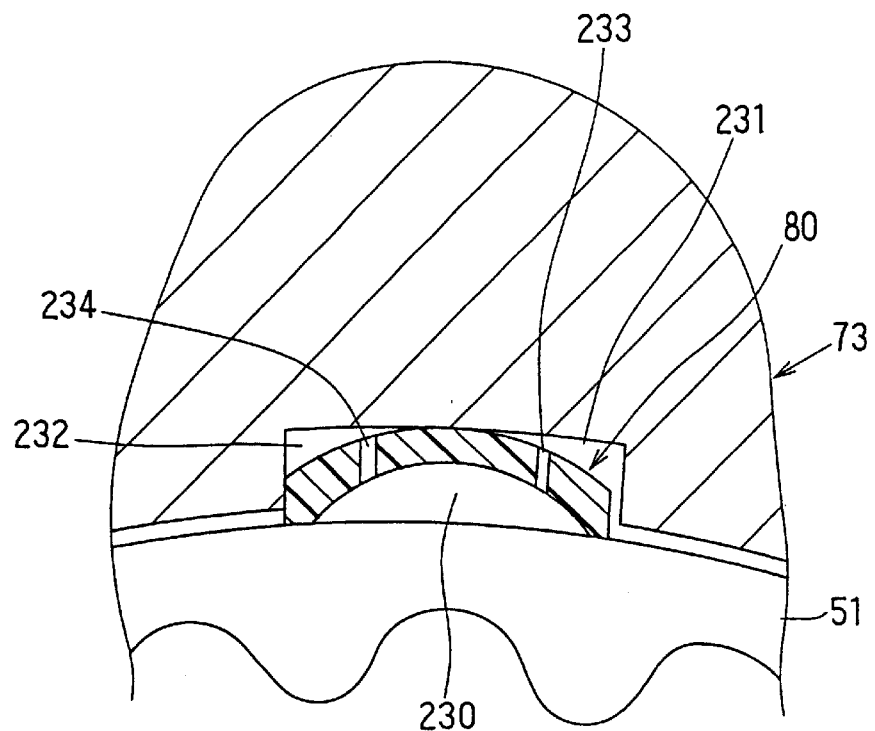

Further, as shown by FIG. 19, the seal member 80 can be constituted by a member warped in a shape of a circular arc. In this case, the whole of the seal member 80 constitutes an elastic portion. That is, by elastic force of the seal member 80, ends of the seal member 80 warped in a shape of a circular arc are brought into contact with the outer rotor 51 and a barrel (projected portion) thereof is brought into contact with the central plate 73 to seal the brake fluid. Further, the seal member 80 is provided with communicating paths 233 and 234 for communicating a space 230 formed between the seal member 80 and the outer rotor 51 and spaces 231 and 232 formed between the seal member 80 and the central plate 73. Thereby, pressure difference between the space 230 and the spaces 231 and 232 can be reduced and deformation of the seal member 80 caused by the pressure difference can be prevented.

Figure 20:
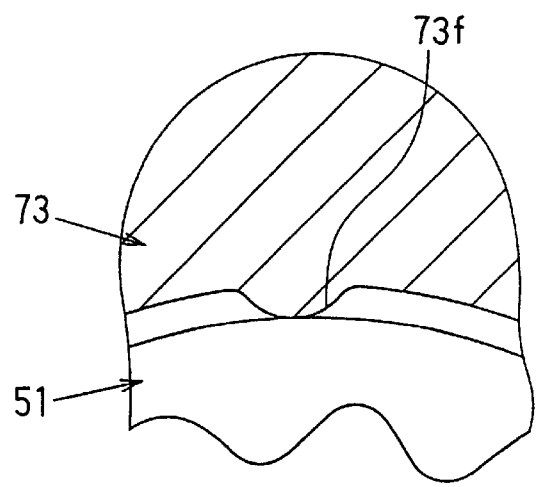

Meanwhile, as shown by FIG. 20, in place of the seal member 80, the sealing performance may be ensured by providing a projected portion 73f in the casing 50. In this case, the casing 50 can play the role of the seal member and therefore, no other member needs to be added for sealing the brake fluid.

Figure 21A:
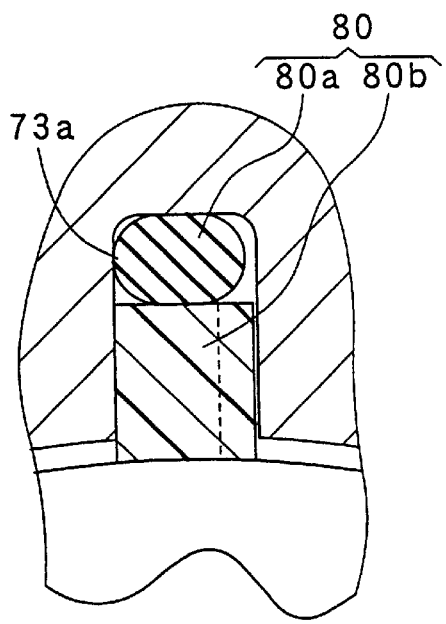
Figure 21B:
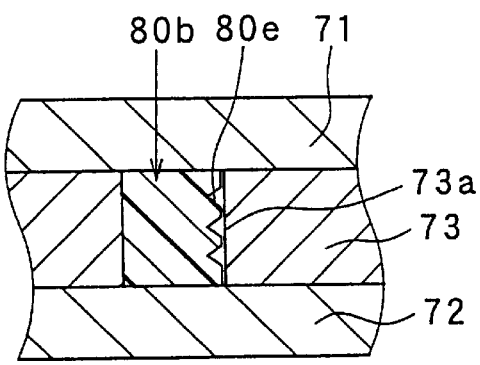

Further, the seal member 80 or 100 shown by FIG. 7 and FIG. 14 through FIG. 20 is formed with the width to a degree of producing more or less clearance when it is arranged in the recessed portion 73a or 73c. However, for example, as shown by FIGS. 21A and 21B, grooves 80e extending in the diameter direction of the outer rotor 51 may be formed at the resin portion 80b so that the brake fluid enters between the recessed portion 73a and the seal member 80.

Although in the embodiments mentioned above, an explanation has been given of the rotary pump used in a brake apparatus, the rotary pump is naturally applicable to other than a brake apparatus.

What is claimed is:

1. A brake apparatus comprising:
a brake fluid pressure generating device which generates brake fluid pressure in accordance with a braking operation carried out by a driver;
a braking force producing device which produces braking force on a wheel when receiving brake fluid pressure;
a main conduit connecting said brake fluid pressure generating device to the braking force producing device for transmitting said brake fluid pressure generated by said brake fluid pressure generating device to said braking force producing device;
an auxiliary conduit connecting said brake fluid pressure generating device to a midway point of said main conduit;
a rotary pump disposed in said auxiliary conduit for sucking brake fluid from a side of said brake fluid pressure generating device and discharging pressurized brake fluid into said main conduit; and
a restriction device disposed in said main conduit between said brake fluid pressure generating device and said midway point of said main conduit, for restricting flow of brake fluid heading for said brake fluid pressure generating device,
wherein said rotary pump comprises:
a drive shaft;
a rotating unit constituted by an outer rotor having an inner teeth portion on its inner periphery and an inner rotor having an outer teeth portion on its outer periphery, said inner rotor being rotated by said drive shaft, wherein a plurality of gap portions are formed between said inner teeth portion and said outer teeth portion by mesh thereof and each of said gap portions changes from a large volume to a small volume and vice versa when said rotating unit rotates; and
a casing for containing said rotating unit, said casing having an opening for allowing said drive shaft to be inserted thereinto, an intake port for introducing brake fluid in said gap portions, and a discharge port for discharging brake fluid from said gap portions, wherein a differential pressure between a pressure at said intake port and a pressure at said discharge port is maintained by a first closed gap portion of which a volume becomes a maximum and a second closed gap portion of which a volume becomes a minimum among said gap portions;
said outer rotor and said inner rotor are assembled in said casing so that, when a clearance between said inner teeth portion of said outer rotor and said outer teeth portion of said inner rotor on a side of said first closed gap portion on a reference line substantially connecting a central axis of said inner rotor is substantially nullified, a first clearance between said outer rotor and said casing on a side of said first closed gap portion on said reference line is not smaller than a second clearance between said outer rotor and said casing on a side of said second closed gap portion on said reference line and a sum of said first and second clearances is at least twice as much as a maximum moving distance of said outer rotor on said reference line.

2. A brake apparatus according to claim 1, wherein said inner rotor and said drive shaft are assembled so that a clearance between said inner rotor and said drive shaft on a side of said first closed portion on said reference line is set to a half of a difference between an inner diameter of said inner rotor and an outer diameter of said drive shaft.

3. A brake apparatus according to claim 1, wherein, when said inner rotor and said outer rotor are assembled in said casing, a highest tooth of the inner teeth portion and a highest tooth of the outer teeth portion are disposed so as to substantially nullify said clearance between said inner teeth portion of said outer rotor and said outer teeth portion of said inner rotor on a side of said first closed portion.

4. A brake apparatus according to claim 1, wherein said casing has a low pressure side communicating path communicating said intake port and an outer periphery of said outer rotor on a side of said intake port and a high pressure side communicating path communicating said discharge port and the outer periphery of said outer rotor on a side of said discharge port.

5. A brake apparatus according to claim 4, further comprising:

first and second seal members for restraining flow of brake fluid in respective intermediaries between said high pressure side communicating path and said low pressure side communicating path on the outer periphery of said outer rotor.

* * * * *